US012784450B2

(12) United States Patent
Terashima

(10) Patent No.: US 12,784,450 B2
(45) Date of Patent: Nov. 3, 2026

(54) INFORMATION PROCESSING APPARATUS, A NON-TRANSITORY COMPUTER-READABLE STORAGE MEDIUM, AND A METHOD

(71) Applicant: CaTe Inc., Tokyo (JP)

(72) Inventor: Kazuhiro Terashima, Tokyo (JP)

(73) Assignee: CATE INC., Tokyo (JP)

( * ) Notice: Subject to any disclaimer, the term of this patent is extended or adjusted under 35 U.S.C. 154(b) by 225 days.

(21) Appl. No.: 18/658,232

(22) Filed: May 8, 2024

(65) Prior Publication Data

US 2024/0290094 A1 Aug. 29, 2024

Related U.S. Application Data

(63) Continuation of application No. PCT/JP2022/040988, filed on Nov. 2, 2022.

(30) Foreign Application Priority Data

Nov. 25, 2021 (JP) ................................ 2021-190692

(51) Int. Cl.

*G06V 20/40* (2022.01)
*G06V 10/778* (2022.01)
*G16H 20/30* (2018.01)

(52) U.S. Cl.

CPC .......... *G06V 20/41* (2022.01); *G06V 10/7788* (2022.01)

(58) Field of Classification Search

CPC ...... G06V 20/41; G06V 10/7788; A61B 5/11; A61B 5/7267; G16H 50/70; G16H 20/30; G16H 50/20; G16H 50/30

USPC .......................................................... 382/181

See application file for complete search history.

(56) References Cited

U.S. PATENT DOCUMENTS

| | | | | |
|---|---|---|---|---|
| 2019/0046044 A1* | 2/2019 | Tzvieli | ................. | A61B 5/0077 |
| 2022/0118315 A1 | 4/2022 | Sankai | | |
| 2023/0081168 A1* | 3/2023 | Kim | ................... | A63B 24/0062 705/2 |
| 2023/0241453 A1* | 8/2023 | Lowery | ................. | A63F 13/213 |

FOREIGN PATENT DOCUMENTS

| | | |
|---|---|---|
| JP | 2004240394 A | 8/2004 |
| JP | 2018110013 A | 7/2018 |
| JP | 2020120910 A | 8/2020 |
| JP | 2021097990 A | 7/2021 |

OTHER PUBLICATIONS

International Search Report on Patentability issued Dec. 20, 2022, in corresponding International Application No. PCT/JP2022/040988, 4 pages.

Saito, "Cardiac Rehabilitation," Journal of the Japanese Physical Therapy Association, 1997, vol. 24, No. 8, 12 pages.

Kim et al., "ViziCal: Accurate Energy Expenditure Prediction for Playing Exergames", Application and Games, UIST' 13, ACM, Oct. 8-11, 2013, 8 pages.

* cited by examiner

*Primary Examiner* — Jennifer Mehmood
*Assistant Examiner* — Dustin Bilodeau
(74) *Attorney, Agent, or Firm* — Maier & Maier, PLLC

(57) ABSTRACT

A program causes a computer to function for obtaining a user video in which a user taking exercise is seen; making, based on the user video, an estimation about an exercise load of the user with respect to an exercise tolerance of the user; and presenting information based on a result of the estimation about the exercise load of the user.

14 Claims, 21 Drawing Sheets

Figure 6

| TRAINING DATA SET | | | | | | |
|---|---|---|---|---|---|---|
| SAMPLE ID | INPUT DATA | | | | | LABELED DATA |
| | SKELETON | FACIAL EXPRESSION | SKIN COLOR | RESPIRATION | HEART RATE | EXERCISE LOAD |
| S001 | · | · | · | · | · | · |
| S002 | · | · | · | · | · | · |
| · | · | · | · | · | · | · |

Figure 9

| TRAINING DATA SET | | | | | | | |
|---|---|---|---|---|---|---|---|
| SAMPLE ID | INPUT DATA | | | | | | LABELED DATA |
| | SKELETON | FACIAL EXPRESSION | SKIN COLOR | RESPIRATION | HEART RATE | HEALTH CONDITION | |
| S001 | · | · | · | · | · | · | · |
| S002 | · | · | · | · | · | · | · |
| · | · | · | · | · | · | · | · |

Figure 14

| TRAINING DATA SET | | | | | |
|---|---|---|---|---|---|
| SAMPLE ID | INPUT DATA | LABELED DATA | | | |
| | SKELETON | VENTILATIO N VOLUME | VENTILATION RATE | VENTILATION ACCELERATION | · |
| S001 | · | · | · | · | · |
| S002 | · | · | · | · | · |
| · | · | · | · | · | · |

Figure 18

| TRAINING DATA SET | | |
|---|---|---|
| SAMPLE ID | INPUT DATA | LABELED DATA |
| | SKELETON | NUMBER OF LEG CYCLES |
| S001 | · | · |
| S002 | · | · |
| · | · | · |

INFORMATION PROCESSING APPARATUS, A NON-TRANSITORY COMPUTER-READABLE STORAGE MEDIUM, AND A METHOD

CROSS-REFERENCE TO RELATED APPLICATIONS

This application is based upon and claims the benefit of priority from the prior Japanese Patent Application No. 2021-190692, filed Nov. 25, 2021, the prior PCT Patent Application No. PCT/JP2022/040988, filed Nov. 2, 2022 the entire contents of which are incorporated herein by reference.

FIELD

Embodiments described herein relates to an information processing apparatus, a non-transitory computer-readable storage medium, and a method.

BACKGROUND

Cardiac rehabilitation aims to help a patient with a heart disease recover physical strength and self-confidence through a comprehensive activity program including exercise therapy and return to comfortable home life and life in society, and to prevent recurrence of the heart disease or rehospitalization. The exercise therapy centers on aerobic exercise such as walking, jogging, cycling, or aerobics. To take aerobic exercise more safely and effectively, it is preferable that a patient take the exercise with an intensity in a neighborhood of an anaerobic threshold (AT) of the patient.

The anaerobic threshold is an example of an evaluation index of exercise tolerance and corresponds to an exercise intensity in a neighborhood of a point of change in a state of a cardiopulmonary function, that is, a boundary between aerobic exercise and anaerobic exercise. The anaerobic threshold is normally determined through a cardiopulmonary exercise test (CPX test), in which expired gas of a target person of the test is collected and analyzed while a gradually-increasing exercise burden is imposed on the target person (see Conventional System). In the CPX test, an anaerobic threshold is determined based on a result measured by an expired gas analysis (e.g., an oxygen uptake, a carbon dioxide output, a tidal volume, a respiratory frequency, a minute ventilation, or a combination thereof). By the CPX test, a maximum oxygen uptake, which corresponds to an exercise intensity in a neighborhood of a maximum exercise tolerance, can be determined in addition to the anaerobic threshold.

Conventional System describes detecting carbon dioxide included in expired gas of a subject and determining a degree of an exercise intensity with respect to an anaerobic threshold of the subject.

BRIEF DESCRIPTION OF DRAWINGS

FIG. 6 is a diagram illustrating a data structure of a training data set in the present embodiment.

FIG. 9 is a diagram illustrating a data structure of a training data set in Modification 1.

FIG. 14 is a diagram illustrating a data structure of a training data set in Modification 5.

FIG. 18 is a diagram illustrating a data structure of a training data set in Modification 6.

DETAILED DESCRIPTION

Figure 1:
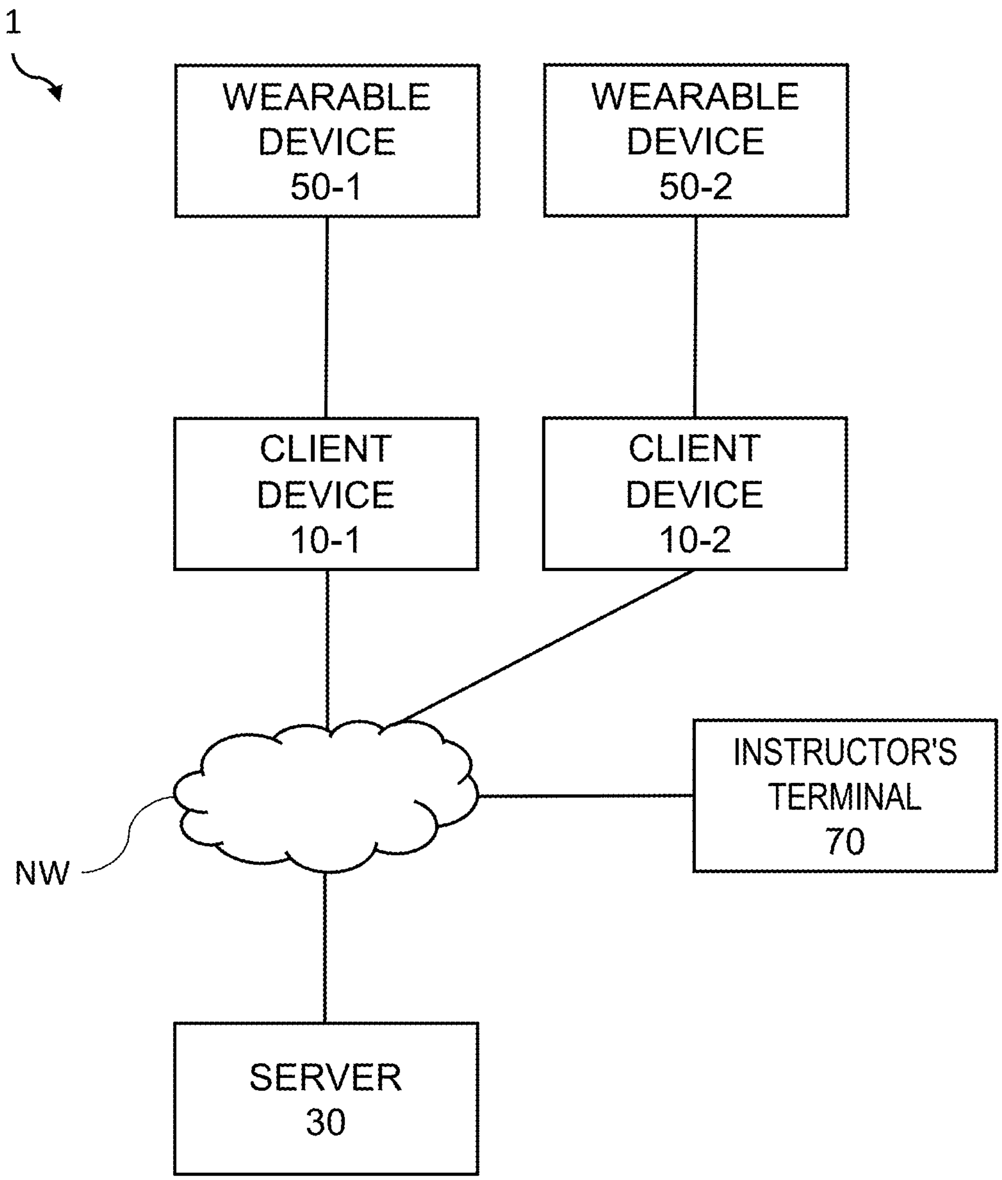
FIG. 1 is a block diagram illustrating a configuration of an information processing system according to the present embodiment.

In general, according to one embodiment, a program according to an aspect of the present disclosure causes a computer to function as means for obtaining a user video in which a user taking exercise is seen; means for making, based on the user video, an estimation about an exercise load of the user with respect to an exercise tolerance of the user; and means for presenting information based on a result of the estimation about the exercise load of the user.

Hereinafter, an embodiment of the present disclosure will be described in detail with reference to the accompanying drawings. Note that in the drawings for illustrating the embodiment, the same components will be denoted by the same reference characters in principle, and repetitive descriptions thereof will be omitted.

Hereinafter, in a case where a plurality of similar elements are present, a matter common to the elements will be described with a common reference character, and a matter about an individual element will be described with a common reference character followed by a sub-number.

(1) Configuration of Information Processing System

A configuration of an information processing system will be described. FIG. 1 is a block diagram illustrating a configuration of an information processing system according to the present embodiment.

As illustrated in FIG. 1, an information processing system 1 includes client devices 10-1 and 10-2, a server 30, wearable devices 50-1 and 50-2, and an instructor's terminal 70.

Here, the number of client devices 10 and the number of wearable devices 50 vary in accordance with, for example, the number of users. The number of instructor's terminals 70 also varies in accordance with, for example, the number of instructors. Therefore, the number of client devices 10 and the number of wearable devices 50 each may be one or may be three or more. Likewise, the number of instructor's terminals 70 may be two or more.

The client devices 10, the server 30, and the instructor's terminal 70 are connected together via a network (e.g., the Internet or an intranet) NW.

The client devices 10 and the wearable devices 50 are connected via wireless channels using, for example, Bluetooth® technology.

The client devices 10 are an example of information processing devices that transmit requests to the server 30. The client devices 10 are each, for example, a smartphone, a tablet terminal, or a personal computer.

The server 30 is an example of an information processing device that provides responses to requests transmitted from the client devices 10 to the instructor's terminal 70. The server 30 is, for example, a web server.

The wearable devices 50 are an example of information processing devices that can be worn on a body (e.g., an arm) of the user.

The instructor's terminal 70 is an example of an information processing device. The instructor's terminal 70 can have the same configuration as the client devices 10.

(1-1) Configuration of Client Device

Figure 2:
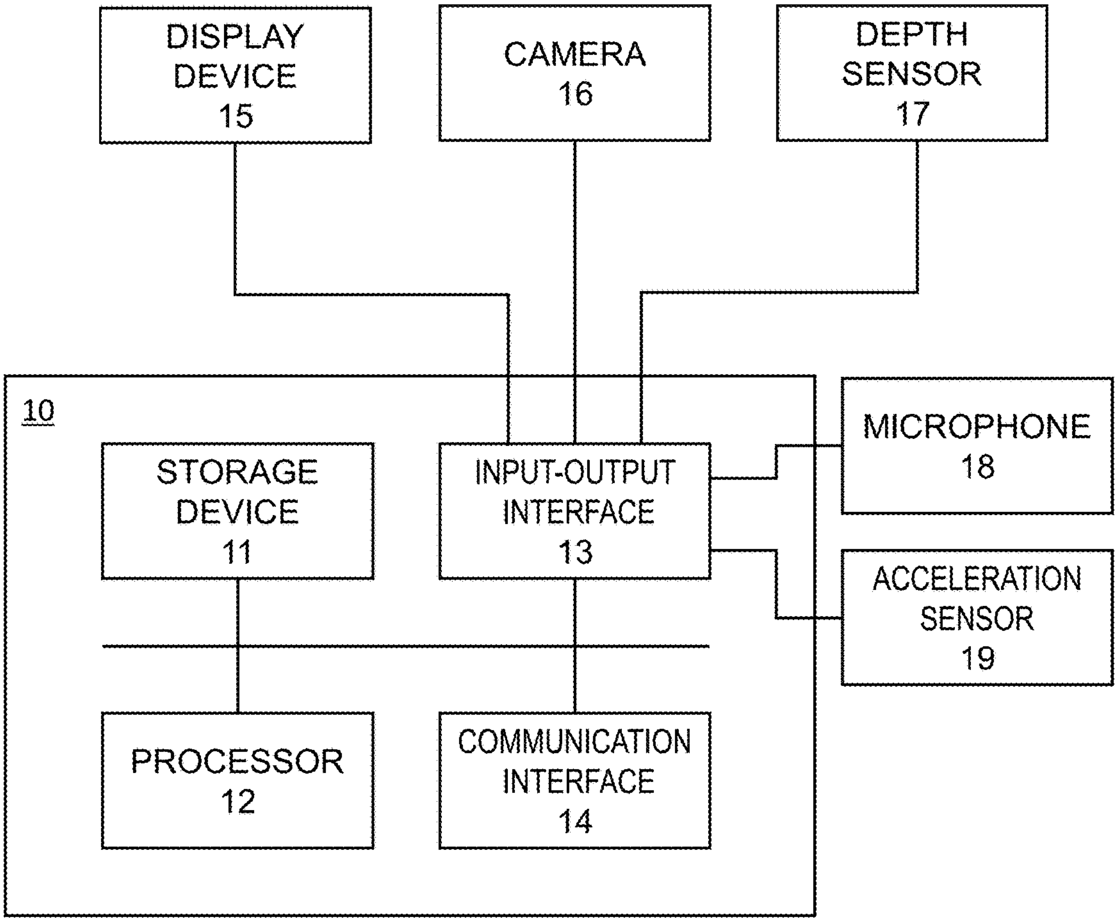
FIG. 2 is a block diagram illustrating a configuration of a client device according to the present embodiment.

A configuration of each client device will be described. FIG. 2 is a block diagram illustrating a configuration of a client device according to the present embodiment.

As illustrated in FIG. 2, each client device 10 includes a storage device 11, a processor 12, an input-output interface 13, and a communication interface 14.

The client device 10 is connected to a display device 15, a camera 16, a depth sensor 17, a microphone 18, and an acceleration sensor 19.

The storage device 11 is configured to store programs and data. The storage device 11 is, for example, a combination of a read only memory (ROM), a random access memory (RAM), and a storage (e.g., a flash memory or a hard disk).

The programs include, for example, the following programs.

- Programs of operating system (OS)
- Programs of applications that execute information processing (e.g., a web browser, a treatment application, a rehabilitation application, or a fitness application).

Here, examples of diseases covered by the treatment application or the rehabilitation application include diseases in which exercise can contribute to relieving their symptoms, such as heart disease, lifestyle-related disease (hypertension, diabetes, dyslipidemia, hyperlipemia), and obesity.

The data includes, for example, the following types of data.

- Database referred to in information processing.
- Data obtained by executing information processing (i.e., results of executing information processing)

The processor 12 is a computer that realizes functions of the client device 10 by running the programs stored in the storage device 11. The processor 12 is, for example, at least one of the following.

- Central Processing Unit (CPU)
- Graphic Processing Unit (GPU)
- Application Specific Integrated Circuit (ASIC)
- Field Programmable Gate Array (FPGA)

The input-output interface 13 is configured to obtain information (e.g., instructions from a user, or an image or a sound of the user) from an input device connected to the client device 10 and to output information (e.g., an image, a command) to an output device connected to the client device 10.

The input device is, for example, the camera 16, the depth sensor 17, the microphone 18, the acceleration sensor 19, a keyboard, a pointing device, a touch panel, a sensor, or a combination thereof.

The output device is, for example, the display device 15, a speaker, or a combination thereof.

The communication interface 14 is configured to control communication between the client device 10 and an external device (e.g., another client device 10, the server 30, a wearable device 50, and the instructor's terminal 70).

Specifically, the communication interface 14 can include a module for communication with the server 30 (e.g., a WiFi module, a mobile communication module, or a combination thereof). The communication interface 14 can include a module for communication with the wearable device 50 (e.g., a Bluetooth module).

The display device 15 is configured to display an image (a still image or a video). The display device 15 is, for example, a liquid crystal display device or an organic electro-luminescence display device.

The camera 16 is configured to perform imaging to generate an image signal.

The depth sensor 17 is, for example, light detection and ranging (LIDAR) sensor. The depth sensor 17 is configured to measure a distance (depth) from the depth sensor 17 to a neighbor object (e.g., a user).

The microphone 18 is configured to receive a sound wave to generate an audio signal.

The acceleration sensor 19 is configured to detect an acceleration.

(1-2) Configuration of Server

Figure 3:
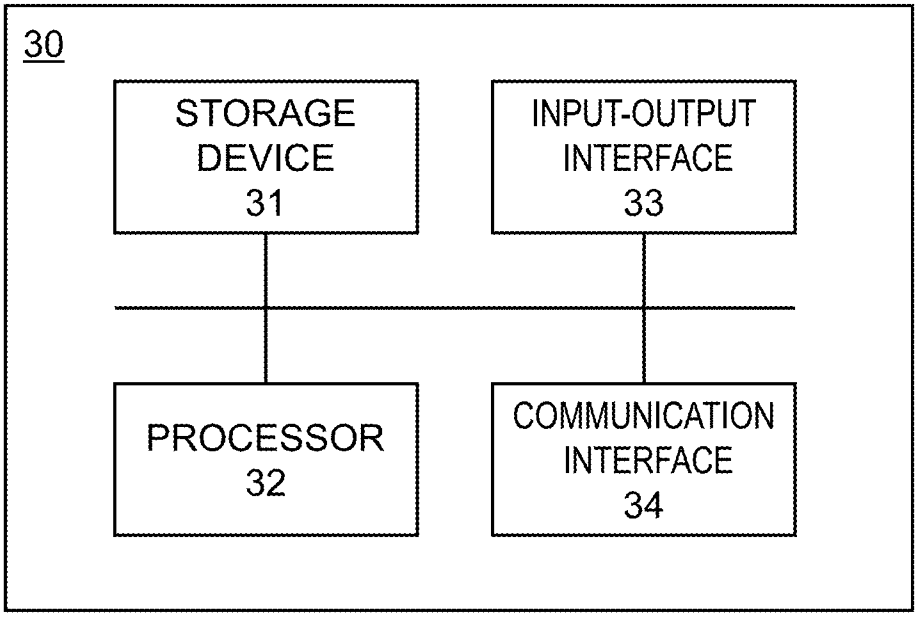
FIG. 3 is a block diagram illustrating a configuration of a server in the present embodiment.

A configuration of the server will be described. FIG. 3 is a block diagram illustrating a configuration of a server in the present embodiment.

As illustrated in FIG. 3, the server 30 includes a storage device 31, a processor 32, an input-output interface 33, and a communication interface 34.

The storage device 31 is configured to store programs and data. The storage device 31 is, for example, a combination of a ROM, a RAM, and a storage.

The programs include, for example, the following programs.

- Programs of OS
- Programs of applications that execute information processing

The data includes, for example, the following types of data.

- Database referred to in information processing.
- Results of executing information processing The processor 32 is a computer that realizes functions of the server 30 by running the programs stored in the storage device 31. The processor 32 is, for example, at least one of the following.

- CPU
- GPU
- ASIC
- FPGA

The input-output interface 33 is configured to obtain information (e.g., instructions from a user) from an input device connected to the server 30 and to output information to an output device connected to the server 30.

The input device is, for example, a keyboard, a pointing device, a touch panel, or a combination thereof.

The output device is, for example, a display device.

The communication interface 34 is configured to control communication between the server 30 and external devices (e.g., the client devices 10 and the instructor's terminal 70).

(1-3) Configuration of Wearable Device

Figure 4:
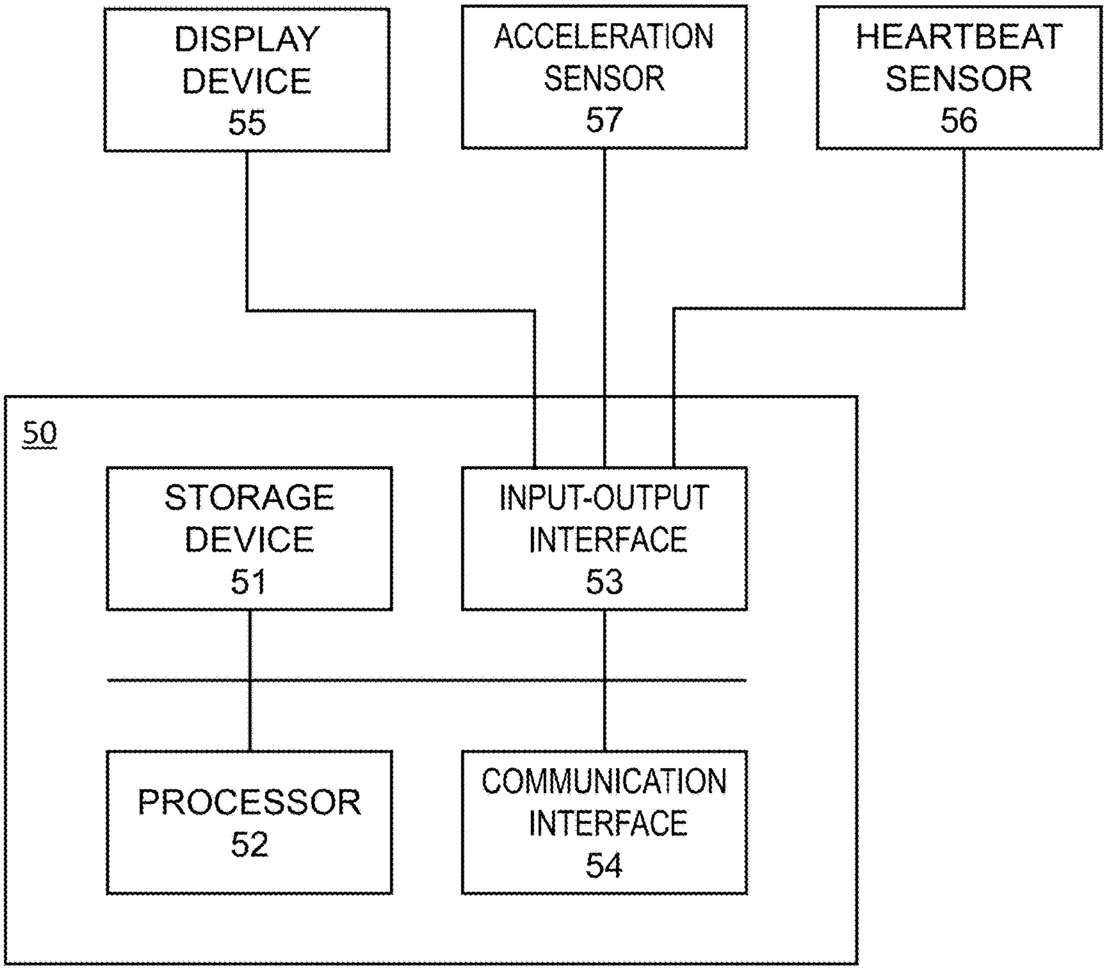
FIG. 4 is a block diagram illustrating a configuration of a wearable device in the present embodiment.

A configuration of each wearable device will be described. FIG. 4 is a block diagram illustrating a configuration of a wearable device in the present embodiment.

As illustrated in FIG. 4, each wearable device 50 includes a storage device 51, a processor 52, an input-output interface 53, and a communication interface 54.

The wearable device 50 is connected to a display device 55, a heartbeat sensor 56, and an acceleration sensor 57.

The storage device 51 is configured to store programs and data. The storage device 51 is, for example, a combination of a ROM, a RAM, and a storage.

The programs include, for example, the following programs.

- Programs of OS
- Programs of applications that execute information processing (e.g., the treatment application, the rehabilitation application, or the fitness application).

The data includes, for example, the following types of data.

- Database referred to in information processing.
- Results of executing information processing The processor 52 is a computer that realizes functions of the wearable device 50 by running the programs stored in the storage device 51. The processor 52 is, for example, at least one of the following.

- CPU
- GPU
- ASIC
- FPGA

The input-output interface 53 is configured to obtain information (e.g., instructions from a user, or a result of sensing) from an input device connected to the wearable device 50 and to output information (e.g., an image, a command) to an output device connected to the wearable device 50.

The input device is, for example, the heartbeat sensor 56, the acceleration sensor 57, a microphone, a keyboard, a pointing device, a touch panel, a sensor, or a combination thereof.

The output device is, for example, the display device 55, a speaker, or a combination thereof.

The communication interface 54 is configured to control communication between the wearable device 50 and an external device (e.g., a client device 10).

Specifically, the communication interface 54 can include a module for communication with the client device 10 (e.g., a Bluetooth module).

The display device 55 is configured to display an image (a still image or a video). The display device 55 is, for example, a liquid crystal display device or an organic electro-luminescence display device.

The heartbeat sensor 56 is configured to measure heartbeats to generate a sensing signal. As an example, the heartbeat sensor 56 measures heartbeats by an optical measurement technique.

The acceleration sensor 57 is configured to detect an acceleration.

(2) Outline of Embodiment

Figure 5:
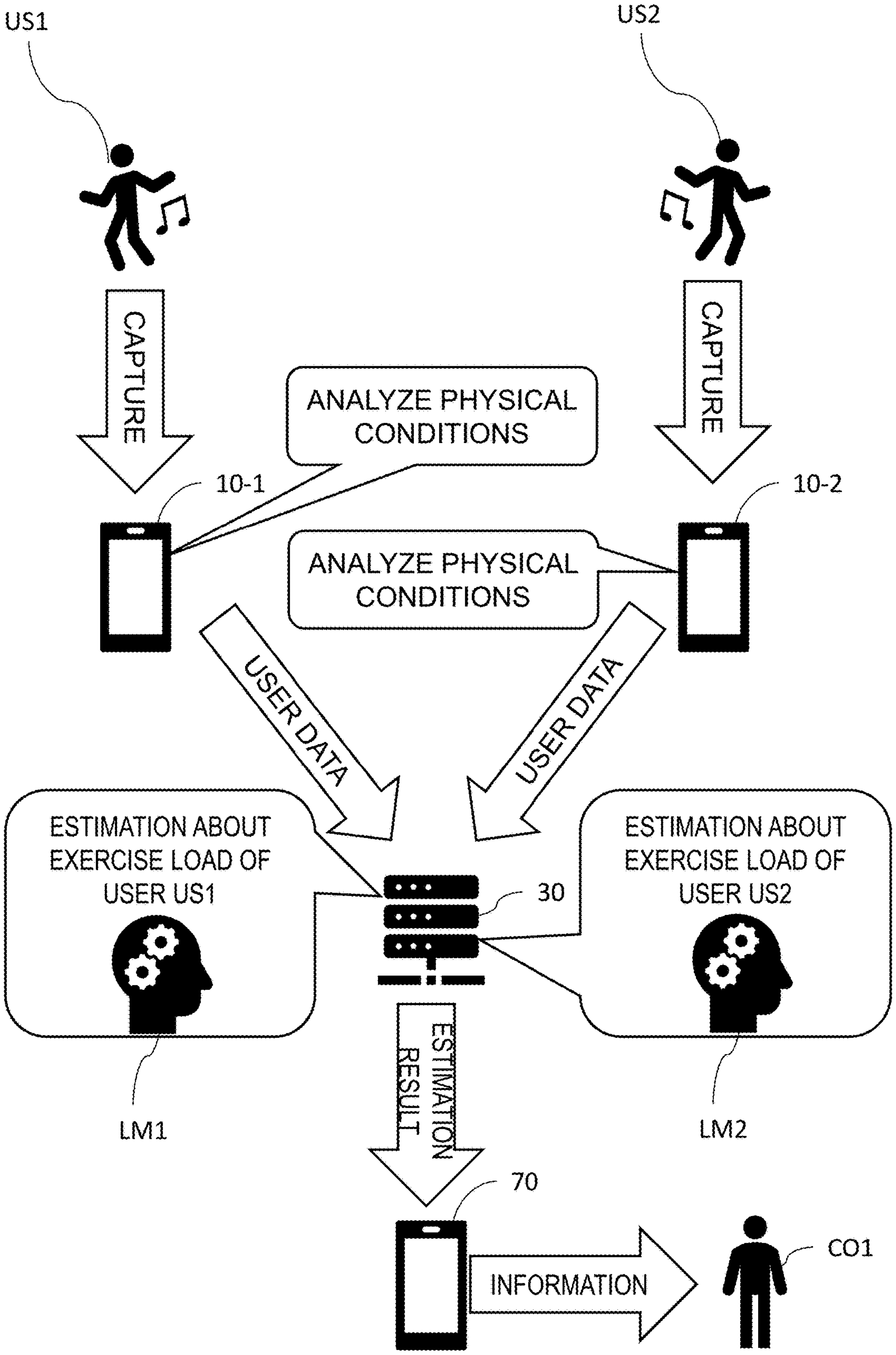
FIG. 5 is an explanatory diagram of an outline of the present embodiment.

An outline of the present embodiment will be described. FIG. 5 is an explanatory diagram of the outline of the present embodiment.

As illustrated in FIG. 5, a camera 16-1 of the client device 10-1 images an appearance (e.g., the whole body) of a user US1 taking exercise, from a distance of, for example, about 2 m. Likewise, a camera 16-2 of the client device 10-2 images an appearance (e.g., the whole body) of a user US2 taking exercise, from a distance of, for example, about 2 m. The client device 10-1 and the client device 10-2 may be placed at appropriate heights with tripods or other height adjustment means. The user US1 and the user US2 are both participants in a common (cardiac) rehabilitation program or an exercise training program. An example illustrated in FIG. 5 is an example in which the users US1 and US2 take gymnastic exercises, and the users US1 and US2 can take any type of exercise (aerobic exercise or anaerobic exercise). The users US1 and US2 may take different types of exercise.

As an example, the camera 16-1 images an appearance of the user US1 from the front or from the front at an angle. Likewise, the camera 16-2 images an appearance of the user US2 from the front or from the front at an angle. A depth sensor 17-1 measures distances (depths) from the depth sensor 17-1 to parts of the user US1. Likewise, a depth sensor 17-2 measures distances (depths) from the depth sensor 17-2 to parts of the user US2. Note that, for example, it is possible to generate three-dimensional video data by combining, for example, video data (two-dimensional) generated by the camera 16-1 and, for example, depth data generated by the depth sensor 17-1. Likewise, it is possible to generate three-dimensional video data by combining, for example, video data (two-dimensional) generated by the camera 16-2 and, for example, depth data generated by the depth sensor 17-2.

A heartbeat sensor 56-1 of the wearable device 50-1 measures heartbeats of the user US1 and transmits a result of the measurement to the client device 10-1. Likewise, a heartbeat sensor 56-2 of the wearable device 50-2 measures heartbeats of the user US2 and transmits a result of the measurement to the client device 10-2.

The client device 10-1 refers to at least the video data obtained from the camera 16-1 and analyzes physical conditions of a user who is taking exercise. The client device 10-1 may further refer to the depth data obtained from the depth sensor 17-1 to analyze physical conditions of a user who is taking exercise. The client device 10-1 transmits, to the server 30, data on physical conditions of the user US1 taking exercise (hereinafter, will be referred to as "user data") based on a result of analyzing the video data (or the video data and the depth data) and the result of the measurement of the heartbeats of the user US1 obtained from the wearable device 50-1.

Likewise, the client device 10-2 refers to at least the video data obtained from the camera 16-2 and analyzes physical conditions of a user who is taking exercise. The client device 10-2 may further refer to the depth data obtained from the depth sensor 17-2 to analyze physical conditions of a user who is taking exercise. The client device 10-2 transmits, to the server 30, user data on physical conditions of the user US2 taking exercise based on a result of analyzing the video data (or the video data and the depth data) and the result of the measurement of the heartbeats of the user US2 obtained from the wearable device 50-2.

The server 30 applies a trained model LM1 (an example of an "estimation model") to the user data obtained from the client device 10-1 to make an estimation about a (cardiopulmonary) exercise load of the user US1 with respect to an exercise tolerance of the user US1. Likewise, the server 30 applies a trained model LM2 (an example of the "estimation model") to the user data obtained from the client device 10-2 to make an estimation about an exercise load of the user US2 with respect to an exercise tolerance of the user US2. The server 30 transmits a result of the estimation (e.g., numeric values indicating the exercise loads of the users US1 and US2) to the instructor's terminal 70. Note that the trained model LM1 and the trained model LM2 may be the same. That is, estimations about exercise loads of different users can be made with a common estimation model.

The instructor's terminal 70 presents information based on the result of the estimations about the exercise loads of the users US1 and US2 to an instructor CO1. The instructor CO1 is an instructor in the rehabilitation program or the exercise training program in which the user US1 and the user US2 participate. The instructor CO1 is, for example, a person who gives instructions on exercise of users. The instructor CO1 is, for example, a medical personnel (e.g., a doctor, a nurse, a pharmacist, a physical therapist, an occupational therapist, a medical technologist), a nutritionist, or a trainer.

During the rehabilitation program or the exercise training program, the client devices 10-1 and 10-2 and the instructor's terminal 70 may be in a video call. Thus, the users US1 and US2 can take exercise, watching a demonstration of the exercise by the instructor CO1 and can ask the instructor CO1 a question or make a request to the instructor CO1, for example. At the same time, checking movements or states of the users US1 and US2, the instructor CO1 can give instructions (e.g., feedback on an individual user or all users or an adjustment of a type, an intensity, or a quantity of exercise for which the instructions are given). Furthermore, the instructor CO1 can enhance a quality of the instructions by taking into consideration information based on the result of the estimations about the exercise loads of the users US1 and US2.

In this manner, based on the videos (or the videos and depths) and heart rates of the users US1 and US2 who are taking exercise, the information processing system 1 makes, for each of the users, an estimation about an exercise load of the user with respect to an exercise tolerance of the user. Therefore, with the information processing system 1, it is possible to make an evaluation about an exercise load of a user with respect to an exercise tolerance of the user without imposing a burden on the user such as wearing special equipment and to present information useful for instructions by the instructor CO1.

(3) Training Data Set

A training data set in the present embodiment will be described. FIG. 6 is a diagram illustrating a data structure of the training data set in the present embodiment.

As illustrated in FIG. 6, the training data set includes a plurality of items of training data. The items of training data are used for training or evaluating a target model. The items of training data each include a sample ID, input data, and labeled data.

The sample ID is information for identifying an item of training data.

The input data is data that is input into the target model at the time of training or evaluation. The input data corresponds to a sample question used at the time of training or evaluating the target model. As an example, the input data is data on physical conditions of a subject who is taking exercise. At least part of the data on the physical conditions of the subject is obtained by referring to subject video data (or subject video data and subject depth data) and analyzing the physical conditions of the subject.

The subject video data is data on a subject video in which the subject taking exercise is seen. The subject video data can be obtained by, for example, imaging an appearance (e.g., the whole body) of the subject in a test about expired gas (a CPX test as an example) from the front or from the front at an angle (e.g., an angle of 45 degrees forward) with a camera (a camera built in a smartphone as an example).

The subject depth data is data on distances (depths) from a depth sensor to parts of the subject taking exercise. The subject depth data can be obtained by causing a depth sensor to act at a time of capturing a subject video.

The subject may be a person identical to a user of which an estimation about an exercise load with respect to an exercise tolerance is made at the time of operating the information processing system 1, or the subject may be a person different from the user. When the subject is a person identical to a user, the target model may learn characteristics of the user, improving its estimation accuracy. On the other hand, allowing the subject to be a person different from the user gives such an advantage that the training data set is easily enriched. The subject may be constituted by a plurality of persons including a user or a plurality of persons not including a user.

In an example in FIG. 6, the input data includes skeleton data, facial expression data, skin color data, respiration data, and heart rate data.

The skeleton data is data (e.g., feature quantities) on a skeleton of the subject taking exercise. The skeleton data includes data on, for example, speeds or accelerations of the parts of the subject (can include data on changes of muscle parts used by the subject or fluctuations in bodily sensation of the subject). The skeleton data can be obtained by referring to the subject video data (or the subject video data and the subject depth data) and analyzing the skeleton of the subject taking exercise. For analyzing the skeleton, as an example, Vision, an SDK for iOS® 14 or another skeleton detection algorithm (e.g., OpenPose, PoseNet, MediaPipe Pose) is available. Alternatively, skeleton data for the training data set can be obtained by, for example, making the subject take exercise with motion sensors worn on parts of the subjects.

A result of skeleton detection can be used in quantitative evaluation of exercise, qualitative evaluation of exercise, or a combination thereof. As a first example, the result of skeleton detection can be used in counting repetitions. As a second example, the result of skeleton detection can be used in evaluation of forms of exercise or evaluation of appropriateness of loads imposed by the exercise. For example, when a type of exercise is a squat, the result of skeleton detection can be used for an evaluation such as whether a knee is too far forward to form a dangerous form or whether a hip is lowered deeply enough to produce a sufficient burden.

The facial expression data is data (e.g., feature quantities) on a facial expression of the subject taking exercise. The facial expression data can be analyzed by applying an algorithm or a trained model to the subject video data.

Alternatively, facial expression data for the training data set can be obtained by, for example, labeling by a person watching a subject video.

The skin color data is data (e.g., feature quantities) on a skin color of the subject taking exercise. The skin color data can be analyzed by applying an algorithm or a trained model to the subject video data. Alternatively, skin color data for the training data set can be obtained by, for example, labeling by a person watching a subject video.

The respiration data is data (e.g., feature quantities) on respiration of the subject taking exercise. The respiration data relates to, for example, a respiratory frequency per unit time or a respiratory pattern. The respiratory pattern can include at least one of the following.

- Number of ventilations
- Ventilation volume
- Ventilation rate (i.e., ventilation volume or the number of ventilations per unit time)
- Ventilation acceleration (i.e., time derivative of ventilation rate)
- Density of output carbon dioxide
- Carbon dioxide output (VCO2)
- Density of consumed oxygen
- Oxygen uptake (VO2)

Data relating to the respiratory pattern may include data that can be calculated based on a combination of the items of data described above, such as a respiratory exchange ratio R (=VCO2/VO2).

The respiration data can be obtained by, for example, analyzing the skeleton data described above. As an example, the following items can be analyzed from the skeleton data.

- Movement (expansion) of shoulders, a chest (sides of the chest can be included), belly, or a combination thereof
- Inspiration time
- Expiration time
- Usage of accessory muscles of respiration Respiration data for the training data set can be obtained from, for example, a result of a test about expired gas performed on the subject taking exercise. An expired gas test that can be performed on the subject taking exercise will be described later in detail. Alternatively, the number of ventilations, the ventilation volume, the ventilation rate, or the ventilation acceleration in the respiration data for the training data set can be obtained from, for example, a result of a pulmonary function test (e.g., a lung function test or a spirometry test) performed on the subject taking exercise. In this case, equipment for the pulmonary function test is not limited to medical equipment. Commercial test equipment may be used.

The heart rate data is data (e.g., feature quantities) on a heart rate of the subject taking exercise. The heart rate data can be obtained by, for example, analyzing the subject video data or a result of analyzing the subject video data (e.g., skin color data). Alternatively, heart rate data for the training data set may be obtained from, for example, a result of the test about expired gas, together with the respiration data described later. The heart rate data on the subject for the training data set can be obtained by also making the subject take the exercise described above with a heartbeat sensor or electrodes for an electrocardiogram monitor worn on the subject.

The labeled data is data that corresponds to a label corresponding to input data (a sample question). The target model is trained (subjected to supervised learning) so as to output data closer to labeled data in response to input data. As an example, the labeled data includes at least one of an index indicating an exercise load with respect to an evaluation index of exercise tolerance and an index serving as a factor for determining the index indicating an exercise load (e.g., an absolute magnitude of an exercise load). Anaerobic threshold (AT) and maximum oxygen uptake (Peak VO2) are an example of the evaluation index of exercise tolerance. The exercise load can be calculated in a form of, for example, a proportion of (real-time) exercise load to a maximum oxygen uptake.

The exercise load is an index for quantitatively evaluating an exercise burden. The exercise burden can be numerically represented using at least one of the following.

- Energy (calorie) consumption
- Oxygen consumption
- Heart rate

The labeled data can be obtained from, for example, the result of the test about expired gas performed on the subject taking exercise. A first example of the test about expired gas is a test that is performed while the subject who wears an expired gas analyzer takes graded exercise (e.g., using an ergometer) (typically, a CPX test). A second example of the test about expired gas is a test that is performed while the subject who wears an expired gas analyzer takes exercise with a load that is constant or can be changed as needed (e.g., body-weight exercise, gymnastics, muscle training).

Alternatively, the labeled data can be obtained from, for example, a result of a test other than the test about expired gas performed on the subject taking exercise. Specifically, the labeled data can be obtained from also a result of a cardiopulmonary exercise load prediction test based on measurement of concentration of lactate in sweat or blood of the subject taking exercise. To measure the concentration of lactate in the subject, a wearable lactate sensor may be used.

(4) Estimation Model

The estimation model to be used by the server 30 corresponds to a trained model created by supervised learning using the training data set (FIG. 6) or using a fine-tuned model or a distilled model of the trained model.

(5) Information Processing

Figure 7:
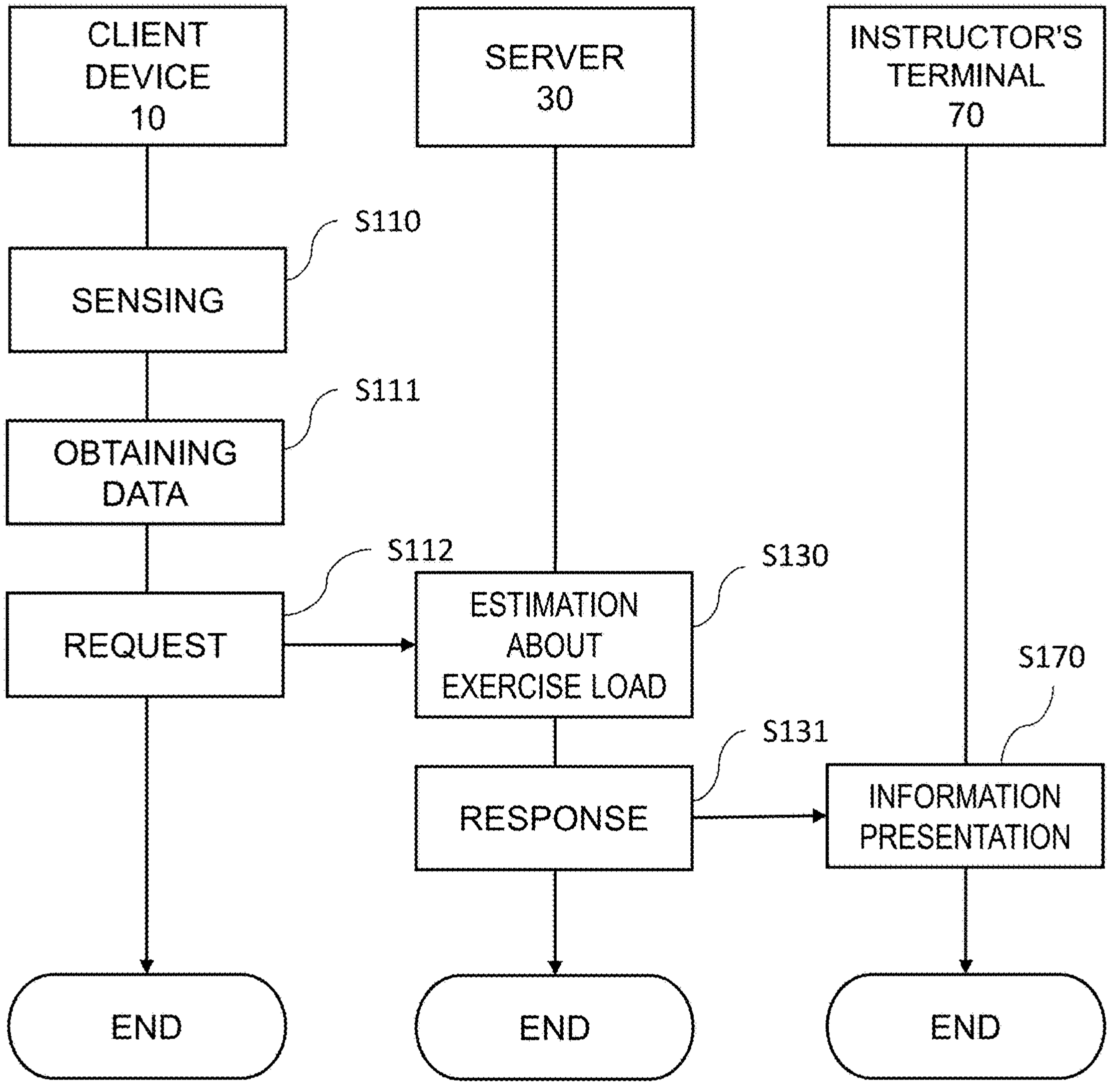
FIG. 7 is a flowchart of information processing in the present embodiment.
Figure 8:
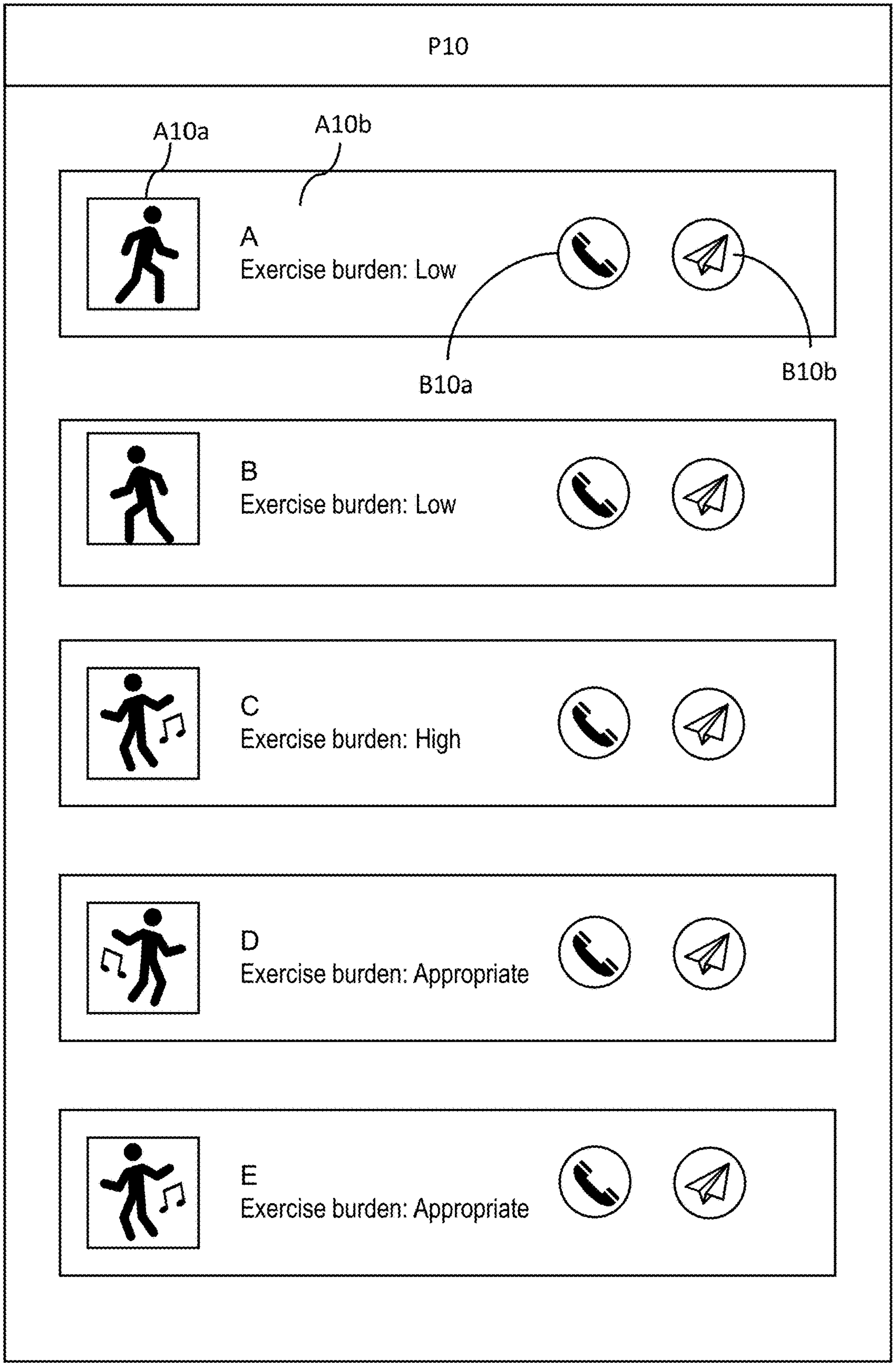
FIG. 8 is a diagram illustrating an example of a screen displayed in the information processing in the present embodiment.

Information processing in the present embodiment will be described. FIG. 7 is a flowchart of the information processing in the present embodiment. FIG. 8 is a diagram illustrating an example of a screen displayed in the information processing in the present embodiment.

The information processing is started when, for example, any one of the following start conditions is established.

- The information processing is invoked by another process.
- A user or an instructor performs an operation to invoke the information processing.
- The client device 10 or the instructor's terminal 70 enters a predetermined state (e.g., a predetermined application is run).
- A predetermined date and time has arrived.
- A predetermined time period has elapsed from a predetermined event.

As illustrated in FIG. 7, the client device 10 executes SENSING (S110).

Specifically, the client device 10 enables the camera 16 to act, thus starting to capture a video of a user who is taking exercise (hereinafter, will be referred to as a "user video"). The client device 10 also enables the depth sensor 17 to act, thus starting to measure distances from the depth sensor 17 to parts of the user taking exercise (hereinafter, will be referred to as "user depths"). The client device 10 further causes the wearable device 50 to start to measure a heart rate with the heartbeat sensor 56 (hereinafter, will be referred to as a "user heart rate"). The client device 10 may further enable any sensor of the client device 10 or the wearable device 50.

After step S110, the client device 10 executes OBTAINING DATA (S111).

Specifically, the client device 10 obtains results of the sensing generated by various sensors that are enabled in step S110. For example, the client device 10 obtains user video data from the camera 16, obtains user depth data from the depth sensor 17, and obtains user heart rate data from the wearable device 50.

After step S111, the client device 10 executes REQUEST (S112).

Specifically, the client device 10 refers to the items of data obtained in step S111 and generates a request. The client device 10 transmits the generated request to the server 30. The request can include, for example, at least one of the following.

- The data obtained in step S111 (e.g., the user video data, the user depth data, or the user heart rate data).
- Data produced by processing the data obtained in step S111.
- User data (e.g., skeleton data, facial expression data, skin color data, respiration data, or a combination thereof) obtained by analyzing the user video data (or the user video data and the user depth data) obtained in step S111.

After step S112, the server 30 executes ESTIMATION ABOUT EXERCISE LOAD (S130).

Specifically, the server 30 obtains input data for the estimation model based on the request obtained from the client device 10. The input data includes, as with the training data, user data (skeleton data, facial expression data, skin color data, respiration data, heart rate data, or a combination thereof). The server 30 makes the estimation about the exercise load of the user with respect to an exercise tolerance of the user by applying the estimation model to the input data. As an example, the server 30 estimates at least one of the following.

- Index indicating an exercise load (e.g., an energy consumption, an oxygen consumption, a heart rate, or a combination thereof) with respect to an evaluation index of exercise tolerance (e.g., an anaerobic threshold or a maximum oxygen uptake).
- Index serving as a factor for determining the index indicating exercise load described above (e.g., an evaluation index of exercise tolerance or an index indicating an absolute magnitude of an exercise load).
- Relationship (e.g., a magnitude relationship, a difference, or a combination thereof) between an absolute magnitude of an exercise load of a user and an evaluation index of exercise tolerance of the user.

After step S130, the server 30 executes RESPONSE (S131).

Specifically, the server 30 generates a response based on a result of the estimation in step S130. The server 30 transmits the generated response to the instructor's terminal 70. As an example, the response can include at least one of the following.

- Data corresponding to a result of an estimation about an exercise load of a user with respect to an exercise tolerance of the user
- Data produced by processing a result of an estimation about an exercise load of a user with respect to an exercise tolerance of the user (e.g., data on a screen to be displayed on a display device of the instructor's terminal 70 (a display device included in the instructor's terminal 70 or connected to the instructor's terminal 70) or data to be referred to for generating the screen).

After step S131, the instructor's terminal 70 executes INFORMATION PRESENTATION (S170).

Specifically, the instructor's terminal 70 displays, on the display device of the instructor's terminal 70, information based on the response obtained from the server 30 (i.e., the result of the estimation about the exercise load of the user with respect to the exercise tolerance of the user).

Note that the information may be presented to the client device 10 or the wearable device 50 for the user in addition to an instructor.

As an example, the instructor's terminal 70 causes the display device to display a screen P10 (FIG. 8). The screen P10 includes display objects A10*a* to A10*b* and operation objects B10*a* to B10*b*.

The display object A10*a* displays information on an appearance of each user (e.g., an exercise video, a thumbnail, a photograph, an avatar, or an icon).

The display object A10*b* displays information on an exercise load of each user with respect to an exercise tolerance of the user. In an example in FIG. 8, the display object A10*b* can indicate, as such information, for example, whether the exercise load of the user is high, appropriate (at the same level), or low compared with a reference value determined in accordance with the exercise tolerance (e.g., an anaerobic threshold) of the user. The display object A10*b* may display a numeric value (e.g., a ratio or a difference) indicating an exercise load with respect to an evaluation index of exercise tolerance or may display a numeric value indicating an absolute magnitude of an exercise load and a numeric value indicating an exercise tolerance side by side.

The operation object B11*a* receives an operation for starting a call (a video call or a voice call) to a user.

The operation object B11*b* receives an operation for transmitting a predefined message to a user. For example, when an instructor selects an operation object B11*b* for a user whose exercise load is low with respect to an exercise tolerance of the user, a message for urging the user to increase the exercise burden is transmitted to a client device 10 of the user. When an instructor selects an operation object B11*b* for a user whose exercise load is high with respect to an exercise tolerance of the user, a message for urging the user to decrease the exercise burden is transmitted to a client device 10 of the user. When an instructor selects an operation object B11*b* for a user whose exercise load is appropriate with respect to an exercise tolerance of the user, a message for urging the user to maintain the exercise burden is transmitted to a client device 10 of the user.

Display positions of sets of objects relating to users may be dynamically changed. As an example, the sets of objects may be displayed in descending order from the user with the largest deviation between a reference value determined in accordance with an exercise tolerance of the user and an exercise load. Alternatively, rather than always presenting information on all users, information on users of which results of estimations about exercise loads satisfy a predetermined condition may be presented (e.g., displayed in a form of objects). The predetermined condition may be, for example, an exercise load being low with respect to an exercise tolerance or an exercise load being high with respect to an exercise tolerance.

After step S112, the client device 10 can finish the information processing (FIG. 7). Note that, in a case where an estimation about an exercise load of a user with respect to an exercise tolerance of the user is made in real time while the user is taking exercise, the client device 10 may return to OBTAINING DATA (S111) after step S112.

(6) Summary

As described above, the information processing system 1 in the embodiment makes an estimation about an exercise load of a user with respect to an exercise tolerance of the user based on a video (or the video and depths) and a heart rate of the user taking exercise and presents information based on a result of the estimation. Thus, it is possible to make an evaluation about the exercise load of the user with respect to the exercise tolerance of the user without imposing a burden on the user such as wearing special equipment.

The information processing system 1 may make the estimation about the exercise load with respect to the exercise tolerance of the user by applying the estimation model to input data based on the video (or the video and the depths) and the heart rate of the user taking exercise. Thus, it is possible to make a statistical estimation about the exercise load of the user in a short time. The estimation model may correspond to a trained model created by supervised learning using the training data set mentioned above (FIG. 6) or using a fine-tuned model or a distilled model of the trained model. Thus, it is possible to efficiently build the estimation model. The input data to which the estimation model is applied may include user data on physical conditions of a user who is taking exercise. Thus, it is possible to improve an accuracy of the estimation model. The user data may include data on at least one of a skeleton, a facial expression, a skin color, respiration, and a heart rate of a user who is taking exercise. Thus, it is possible to improve an accuracy of the estimation model. Furthermore, the subject may be a person identical to a user. Thus, it is possible to make the estimation with high accuracy by using a model that has learned characteristics of the user.

The number of users may be any number as mentioned above. However, in a case where there are a plurality of users, the information processing system 1 in the embodiment may make an estimation about an exercise load of each of the plurality of users with respect to an exercise tolerance of the user and present information based on results of the estimation to an instructor of the users. Thus, even in a case where the instructor gives instructions to many users simultaneously, the instructor can grasp exercise loads of the users and intervene appropriately. Alternatively, in a case where there are a plurality of users, the information processing system 1 in the embodiment may make an estimation about an exercise load of each of the plurality of users with respect to an exercise tolerance of the user and present, to an instructor, information on users of which results of the estimation satisfy a predetermined condition. Thus, even in a case where the instructor gives instructions to many users simultaneously, the instructor can easily identify a user who needs individual care and intervene appropriately.

(7) Modifications

Hereinafter, modifications of the present embodiment will be described.

(7-1) Modification 1

Modification 1 will be described. Modification 1 is an example of altering input data for the estimation model.

(7-1-1) Outline of Modification 1

An outline of Modification 1 will be described. In the present embodiment, an example in which the estimation model is applied to input data based on a user video is shown. In Modification 1, an estimation about an exercise load of a user with respect to an exercise tolerance of the user can be made by applying the estimation model to input data based on both a user video and health conditions of the user.

The health conditions include at least one of the following.

- Age
- Sex
- Height
- Weight
- Body fat percentage
- Muscle mass
- Bone density
- Present illness
- Past medical history
- Oral medicine history
- Surgical history
- Life history (e.g., smoking history, drinking history, activity of daily living (ADL), frailty score, etc.)
- Family medical history
- Result of pulmonary function test
- Results of tests other than the pulmonary function test (e.g., a result of blood test, urinalysis, electrocardiography (including Holter electrocardiography), echocardiography, X-ray examination, computed tomography (including cardiac morphology CT, coronary CT), MRI scan, radioisotope examination, PET scan, etc.)
- Data obtained while cardiac rehabilitation is performed (including Borg scale)

(7-1-2) Training Data Set

A training data set in Modification 1 will be described. FIG. 9 is a diagram illustrating a data structure of the training data set in Modification 1.

As illustrated in FIG. 9, the training data set in Modification 1 includes a plurality of items of training data. The items of training data are used for training or evaluating a target model. The items of training data each include a sample ID, input data, and labeled data.

The sample ID and the labeled data are as described in the present embodiment.

The input data is data that is input into the target model at the time of training or evaluation. The input data corresponds to a sample question used at the time of training or evaluating the target model. As an example, the input data is data on physical conditions of a subject who is taking exercise (e.g., relatively dynamic data) and data on health conditions of the subject (i.e., relatively static data). The data on the physical conditions of the subject is as described in the present embodiment.

The data on health conditions of the subject can be obtained by various methods. The data on health conditions of the subject may be obtained at any timings including before, during, and after exercise of the subject. The data on health conditions of the subject may be obtained based on a declaration from the subject or a medical attendant of the subject, may be obtained by extracting information associated with the subject in a medical information system, or may be obtained via an application (e.g., a healthcare application) of the subject.

(7-1-3) Estimation Model

In Modification 1, the estimation model to be used by the server 30 corresponds to a trained model created by supervised learning using the training data set (FIG. 9) or using a fine-tuned model or a distilled model of the trained model.

(7-1-4) Information Processing

Information processing in Modification 1 will be described with reference to FIG. 7.

In Modification 1, as in FIG. 7, the client device 10 executes SENSING (S110).

After step S110, the client device 10 executes OBTAINING DATA (S111).

Specifically, the client device 10 obtains results of the sensing generated by various sensors that are enabled in step S110. For example, the client device 10 obtains user video data from the camera 16, obtains user depth data from the depth sensor 17, and obtains user heart rate data from the wearable device 50.

The client device 10 further obtains data on health conditions of a user (hereinafter, "user health condition data"). For example, the client device 10 may obtain the user health condition data based on an operation (declaration) from the user or a medical attendant of the user, may obtain the user health condition data by extracting information associated with the user in a medical information system, or may obtain the user health condition data via an application (e.g., a healthcare application) of the user. Note that the client device 10 may obtain the user health condition data at a timing different from step S111 (e.g., before step S110, at the same timing as step S110, at a timing after step S111).

After step S111, the client device 10 executes REQUEST (S112).

Specifically, the client device 10 refers to the items of data obtained in step S111 and generates a request. The client device 10 transmits the generated request to the server 30. The request can include, for example, at least one of the following.

- The data obtained in step S111 (e.g., the user video data, the user depth data, the user heart rate data, or the user health condition data).
- Data produced by processing the data obtained in step S111.
- User data (e.g., skeleton data, facial expression data, skin color data, respiration data, or a combination thereof) obtained by analyzing the user video data (or the user video data and the user depth data) obtained in step S111.

After step S112, the server 30 executes ESTIMATION ABOUT EXERCISE LOAD (S130).

Specifically, the server 30 obtains input data for the estimation model based on the request obtained from the client device 10. The input data includes, as with the training data, user data (skeleton data, facial expression data, skin color data, respiration data, heart rate data, or a combination thereof, and health condition data). The server 30 makes the estimation about the exercise load of the user with respect to an exercise tolerance of the user by applying the estimation model to the input data. As an example, the server 30 estimates at least one of the following.

- Index indicating an exercise load (e.g., an energy consumption, an oxygen consumption, a heart rate, or a combination thereof) with respect to an evaluation index of exercise tolerance (e.g., an anaerobic threshold or a maximum oxygen uptake).
- Index serving as a factor for determining the index indicating exercise load described above (e.g., an evaluation index of exercise tolerance or an index indicating an absolute magnitude of an exercise load).
- Relationship (e.g., a magnitude relationship, a difference, or a combination thereof) between an absolute magnitude of an exercise load of a user and an evaluation index of exercise tolerance of the user.

As in FIG. 7, after step S130, the server 30 executes RESPONSE (S131).

As in FIG. 7, after step S131, the instructor's terminal 70 executes INFORMATION PRESENTATION (S170).

(7-1-5) Summary

As described above, an information processing system 1 in Modification 1 makes an estimation about an exercise load of a user with respect to an exercise tolerance of the user by applying the estimation model to input data based on both a user video and health conditions of the user. Thus, it is possible to make the estimation with high accuracy by further taking the health conditions of the user into consideration. For example, the estimation can be made appropriately even when the health conditions of the user differ from health conditions of a subject from which the training data originates.

(7-2) Modification 2

Modification 2 will be described. Modification 2 is an example of analyzing a relationship between an exercise load of a user and cardiopulmonary conditions of the user and presenting information based on a result of the analysis.

In Modification 2, the client device 10 of each user transmits data on cardiopulmonary conditions of the user to the server 30. The data on the cardiopulmonary conditions may be included in a request. This process can be executed in, for example, step S112 in FIG. 7 or at another timing. The data indicating the cardiopulmonary conditions is, for example, heart rate data, respiration data (e.g., an oxygen consumption), or a combination thereof. The server 30 accumulates, for each user, an exercise load estimated by the technique according to the present embodiment or Modification 1 and data indicating cardiopulmonary conditions of the user obtained from the client device 10 in association with each other.

The server 30 analyzes a relationship between the exercise load and the cardiopulmonary condition of the user. This process can be executed in, for example, step S130 in FIG. 7 or at another timing.

Specifically, the server 30 determines whether the cardiopulmonary conditions are appropriate for the exercise load estimated on a user (hereinafter, will be referred to as an "estimated exercise load") by referring to data that is accumulated for the user in the past (hereinafter, will be referred to as "cardiopulmonary history data"). As an example, the server 30 predicts cardiopulmonary conditions corresponding to the estimated exercise load (hereinafter, will be referred to as "predicted cardiopulmonary conditions") by referring to past exercise loads and cardiopulmonary conditions of the user in the cardiopulmonary history data on the user. When cardiopulmonary conditions measured for the user deviate from the predicted cardiopulmonary conditions, the server 30 determines that the cardiopulmonary conditions of the user are not appropriate. As an example, when an actually measured value of a heart rate of one user exceeds a predicted heart rate (e.g., a heart rate obtained in the past with a cardiopulmonary exercise load that is at the same level as a current cardiopulmonary exercise load), the server 30 determines that the user is running out of breath more than usual.

Cardiopulmonary conditions corresponding to an estimated exercise load may be predicted using a trained model. In machine learning, the cardiopulmonary history data can be used as training data.

The server 30 transmits, to the instructor's terminal 70, information based on a result of analyzing the relationship between the exercise load and the cardiopulmonary conditions of the user (e.g., information indicating a user whose cardiopulmonary conditions are determined to be not appropriate, information indicating cardiopulmonary conditions predicted for the user (e.g., running out of breath), or a combination thereof). This process can be executed in, for example, step S131 in FIG. 7 or at another timing. Such information may be included in a response.

The instructor's terminal 70 presents the information based on the result of analyzing the relationship between the exercise load and the cardiopulmonary conditions of the user. This process can be executed in, for example, step S170 in FIG. 7 or at another timing.

Specifically, the instructor's terminal 70 displays the information on the display device of the instructor's terminal 70. An instructor may give instructions (e.g., feedback on an individual user or all users or an adjustment of a type, an intensity, or a quantity of exercise for which the instructions are given) with the displayed information taken into consideration.

Note that the information may be presented to the client device 10 or the wearable device 50 for the user in addition to an instructor.

Figure 10:
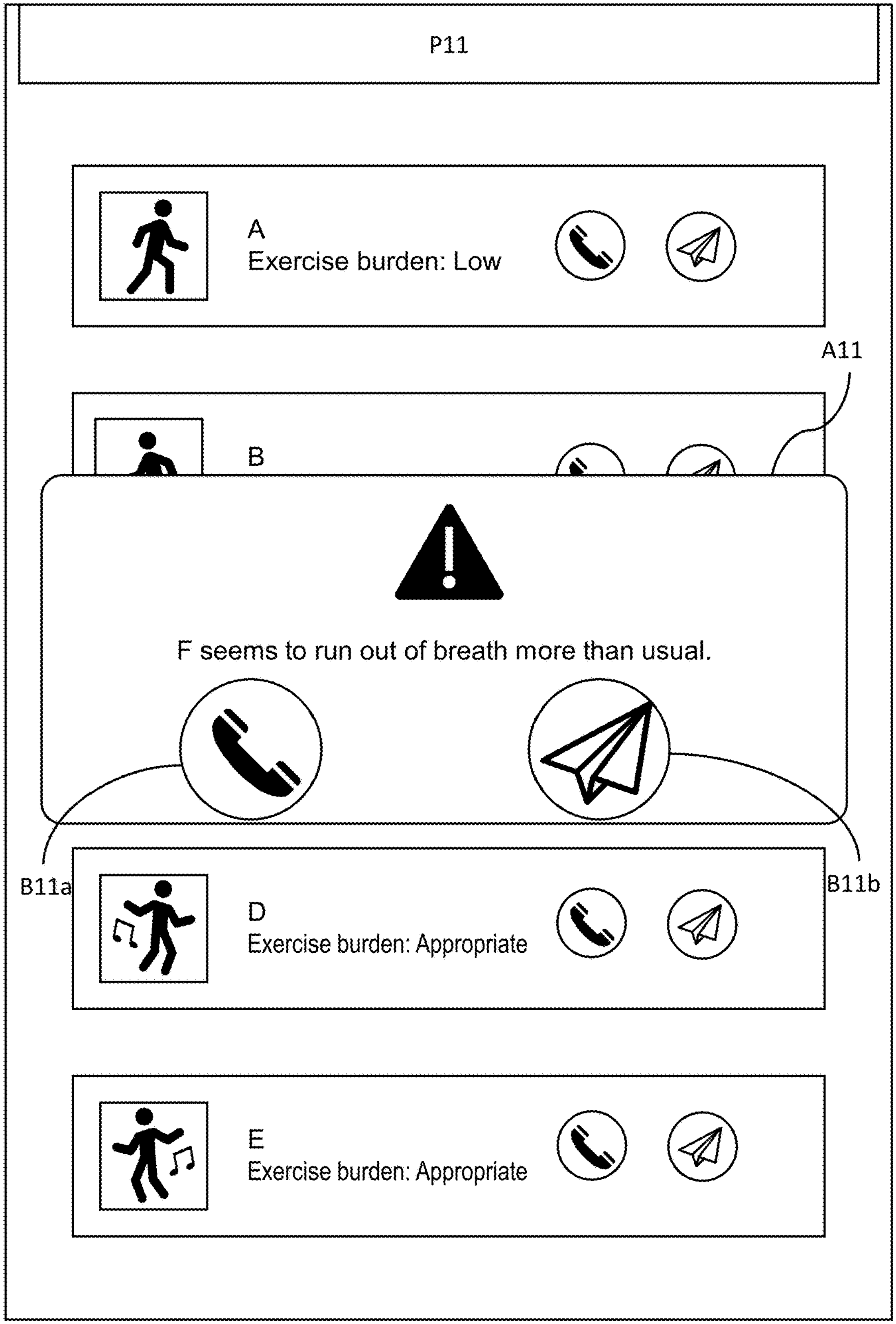
FIG. 10 is a diagram illustrating an example of a screen displayed in information processing in Modification 2.

FIG. 10 is a diagram illustrating an example of a screen displayed in information processing in Modification 2.

As an example, the instructor's terminal 70 causes the display device to display a screen P11 (FIG. 10). The screen P11 includes a display object A11 and operation objects B11*a* to B11*b*.

The display object A11 displays information based on a result of analysis of a relationship between an exercise load and cardiopulmonary conditions of a user. In the example in FIG. 10, the display object A11 displays a user whose cardiopulmonary conditions are determined to be not appropriate and information that indicates cardiopulmonary conditions predicted for the user. As an example, the display object A11 is displayed in a pop-up manner in response to a determination that cardiopulmonary conditions of any user are not appropriate.

The operation object B11*a* receives an operation for starting a call (a video call or a voice call) to a user who is a target person of the information displayed by the display object A11 (hereinafter, will be referred to as a "target user").

The operation object B11*b* receives an operation for transmitting a predefined message to the target user. As an example, when an instructor selects the operation object B11*b*, a message for urging the target user to decrease an exercise burden, stop exercise, consult a doctor, or make a reservation for the consultation is transmitted to a client device 10 of the target user.

As described above, an information processing system 1 in Modification 2 analyzes a relationship between an exercise load of a user and cardiopulmonary conditions of the user based on cardiopulmonary history data on the user and presents information based on a result of the analysis. Thus, it is possible to spot in an early stage a sign of abnormality such as a user running out of breath more than usual and give instructions with consideration given to safety of the user (e.g., urging the user to make an exercise load appropriate or consult a doctor).

(7-3) Modification 3

Modification 3 will be described. Modification 3 is an example of making an estimation about a sign of heart failure in a user based on a user video or user voice.

In Modification 3, the server 30 makes an estimation about a sign of heart failure in a user based on a user video or user voice. This process can be executed in, for example, step S130 in FIG. 7 or at another timing. The user voice is obtained by the client device 10 records, using the microphone 18 for example, voice of the user taking exercise in, for example, step S111 in FIG. 7 or at another timing.

Specifically, the server 30 determines whether the user has a sign of heart failure (e.g., face edema) by analyzing user video data or a result of analyzing the user video data (e.g., user data such as skin color data). Alternatively, the server 30 determines whether the user has a sign of heart failure (e.g., vocal fremitus) by analyzing user voice data or a result of analyzing the user voice data. Such determination is realized by applying an algorithm or a trained model to at least one of the user video data, the result of analyzing the user video data, the user voice data, and the result of analyzing the user voice data (hereinafter, will be referred to as "input data"). The trained model can be built by performing machine learning on a relationship between the input data and whether the subject has a sign of heart failure.

The server 30 transmits, to the instructor's terminal 70, information based on a result of an estimation about a sign of heart failure in a user (e.g., information indicating a user who is determined to have a sign of heart failure, information indicating a sign of heart failure predicted for the user (e.g., face edema or vocal fremitus), or a combination thereof). This process can be executed in, for example, step S131 in FIG. 7 or at another timing. Such information may be included in a response.

The instructor's terminal 70 presents information based on the result of the estimation about the sign of heart failure in the user. This process can be executed in, for example, step S170 in FIG. 7 or at another timing.

Specifically, the instructor's terminal 70 displays the information on the display device of the instructor's terminal 70. An instructor may give instructions (e.g., feedback on an individual user or all users or an adjustment of a type, an intensity, or a quantity of exercise for which the instructions are given) with the displayed information taken into consideration.

Note that the information may be presented to the client device 10 or the wearable device 50 for the user in addition to an instructor.

Figure 11:
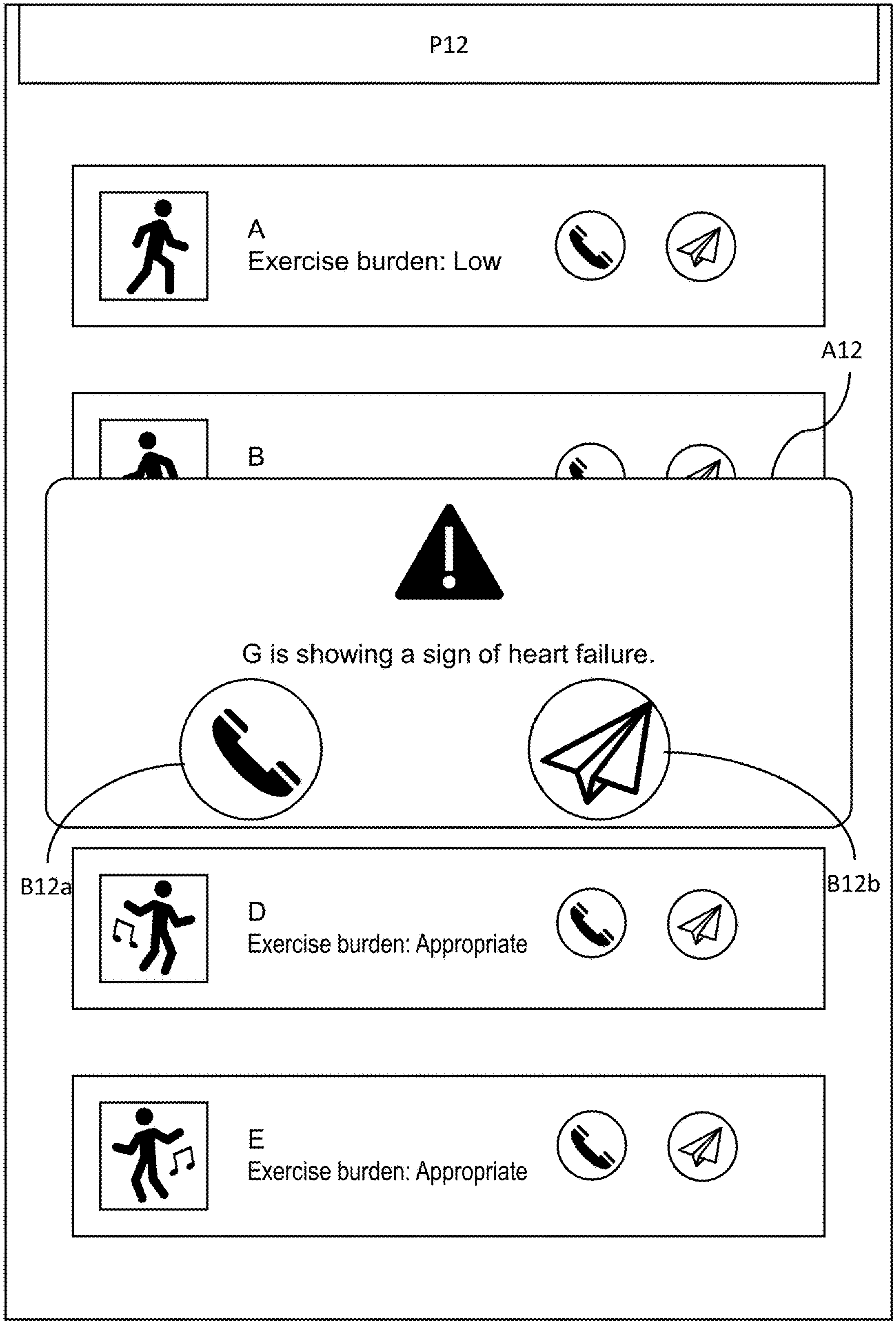
FIG. 11 is a diagram illustrating an example of a screen displayed in information processing in Modification 3.

FIG. 11 is a diagram illustrating an example of a screen displayed in information processing in Modification 3.

As an example, the instructor's terminal 70 causes the display device to display a screen P12 (FIG. 11). The screen P12 includes a display object A12 and operation objects B12*a* to B12*b*.

The display object A12 displays information based on a result of an estimation about a sign of heart failure in a user. In the example in FIG. 11, the display object A12 displays a user who is determined to have a sign of heart failure and information that indicates a sign of heart failure predicted for the user. As an example, the display object A12 is displayed in a pop-up manner in response to a determination that any user has a sign of heart failure.

The operation object B12*a* receives an operation for starting a call (a video call or a voice call) to a user who is a target person of the information displayed by the display object A12 (hereinafter, will be referred to as a "target user").

The operation object B12*b* receives an operation for transmitting a predefined message to the target user. As an example, when an instructor selects the operation object B12*b*, a message for urging the target user to decrease an exercise burden, stop exercise, consult a doctor, or make a reservation for the consultation is transmitted to a client device 10 of the target user.

As described above, an information processing system 1 in Modification 3 estimates a sign of heart failure in a user based on a user video or user voice and presents information based on a result of the estimation. Thus, it is possible to spot in an early stage a sign of abnormality such as a user having a sign of heart failure and give instructions with consideration given to safety of the user (e.g., urging the user to make an exercise load appropriate or consult a doctor).

The above description is given on the assumption that Modification 3 is combined with at least one of the present embodiment, Modification 1, or Modification 2. However, Modification 3 can be carried out independently of any one of the present embodiment or the modifications. That is, it is also possible to make an estimation about a sign of heart failure in a user without making an estimation about an exercise load of the user with respect to an exercise tolerance of the user.

(7-4) Modification 4

Modification 4 will be described. Modification 4 is an example of making an estimation about mental conditions of a user based on a user video or user voice.

In Modification 4, the server 30 makes an estimation about mental conditions of a user based on a user video or user voice. This process can be executed in, for example, step S130 in FIG. 7 or at another timing. The user voice is obtained by the client device 10 records, using the microphone 18 for example, voice of the user taking exercise in, for example, step S111 in FIG. 7 or at another timing.

Specifically, the server 30 makes an estimation about mental conditions of the user (e.g., determines whether the mental conditions are good) by analyzing at least one of user video data, a result of analyzing the user video data (e.g., user data such as facial expression data), user voice data, and a result of analyzing the user voice data (hereinafter, will be referred to as "input data"). Such determination is realized by applying an algorithm or a trained model to the input data. The trained model can be built by performing machine learning on a relationship between input data based on a subject video or subject voice (e.g., facial expression, or at least one of volume, pitch, length, and intonation of voice, and amounts of change therein) and mental conditions of the subject (e.g., presence or absence of a sign of depression or a depressive state, etc.).

The server 30 transmits, to the instructor's terminal 70, information based on a result of an estimation about mental conditions of a user (e.g., information indicating a user who is determined to be not good in mental conditions, information indicating mental conditions predicted for the user (e.g., a sign of depression or a depressive state), or a combination thereof). This process can be executed in, for example, step S131 in FIG. 7 or at another timing. Such information may be included in a response.

The instructor's terminal 70 presents information based on the result of the estimation about the mental conditions of the user. This process can be executed in, for example, step S170 in FIG. 7 or at another timing.

Specifically, the instructor's terminal 70 displays the information on the display device of the instructor's terminal 70. An instructor may give instructions (e.g., feedback on an individual user or all users or an adjustment of a type, an intensity, or a quantity of exercise for which the instructions are given) with the displayed information taken into consideration.

Note that the information may be presented to the client device 10 or the wearable device 50 for the user in addition to an instructor.

Figure 12:
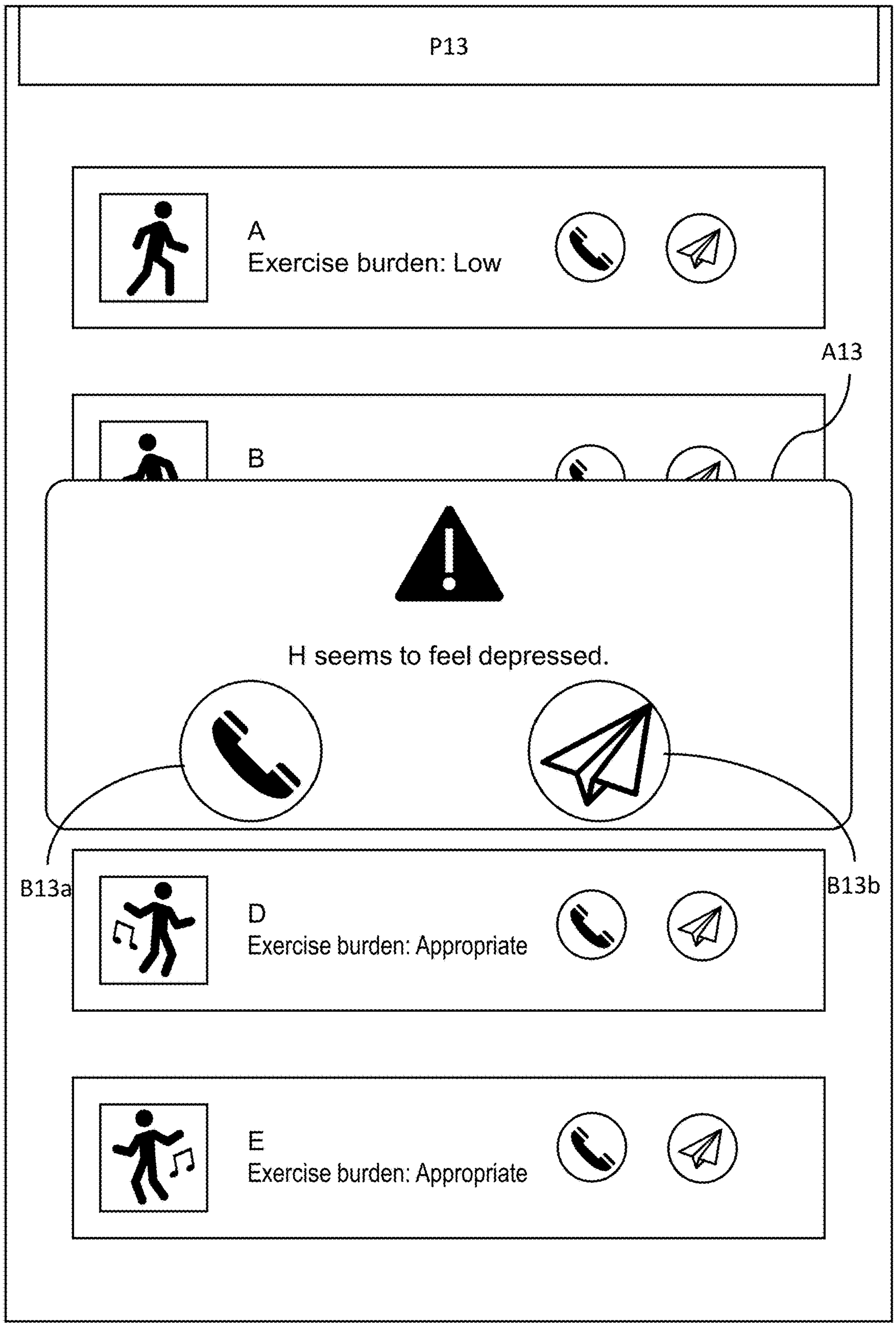
FIG. 12 is a diagram illustrating an example of a screen displayed in information processing in Modification 4.

FIG. 12 is a diagram illustrating an example of a screen displayed in information processing in Modification 4.

As an example, the instructor's terminal 70 causes the display device to display a screen P13 (FIG. 12). The screen P13 includes a display object A13 and operation objects B13*a* to B13*b*.

The display object A13 displays information based on a result of an estimation about mental conditions of a user. In the example in FIG. 12, the display object A13 displays a user whose mental conditions are determined to be not good and information that indicates mental conditions (e.g., a sign of depression or a depressive state, such as feeling depressed) predicted for the user. As an example, the display object A13 is displayed in a pop-up manner in response to a determination that mental conditions of any user are not good.

The operation object B13*a* receives an operation for starting a call (a video call or a voice call) to a user who is a target person of the information displayed by the display object A13 (hereinafter, will be referred to as a "target user").

The operation object B13*b* receives an operation for transmitting a predefined message to the target user. As an example, when an instructor selects the operation object B13*b*, a message for urging the target user to decrease an exercise burden, stop exercise, make an application for counseling, consult a doctor, or make a reservation for the consultation is transmitted to a client device 10 of the target user.

As described above, an information processing system 1 in Modification 4 estimates mental conditions of a user based on a user video or user voice and presents information based on a result of the estimation. Thus, it is possible to spot, in an early stage, mental conditions of a user being not good and give instructions with consideration given to safety of the user (e.g., urging the user to make an exercise load appropriate, make an application for counseling, or consult a doctor).

The above description is given on the assumption that Modification 4 is combined with at least one of the present embodiment and Modification 1 to Modification 3. However, Modification 4 can be carried out independently of any one of the present embodiment or the modifications. That is, it is also possible to make an estimation about mental conditions of a user without making an estimation about an exercise load of the user with respect to an exercise tolerance of the user.

(7-5) Modification 5

Modification 5 will be described. Modification 5 is an example of making an estimation about a ventilatory parameter associated with respiratory movement of a user by applying input data based on a user video in which an appearance of the user is seen to an estimation model.

In the present modification, definitions of some terms may be different from those in the present embodiment, but the definitions in the present modification take precedence in the description of the present modification.

(7-5-1) Outline of Modification 5

Figure 13:
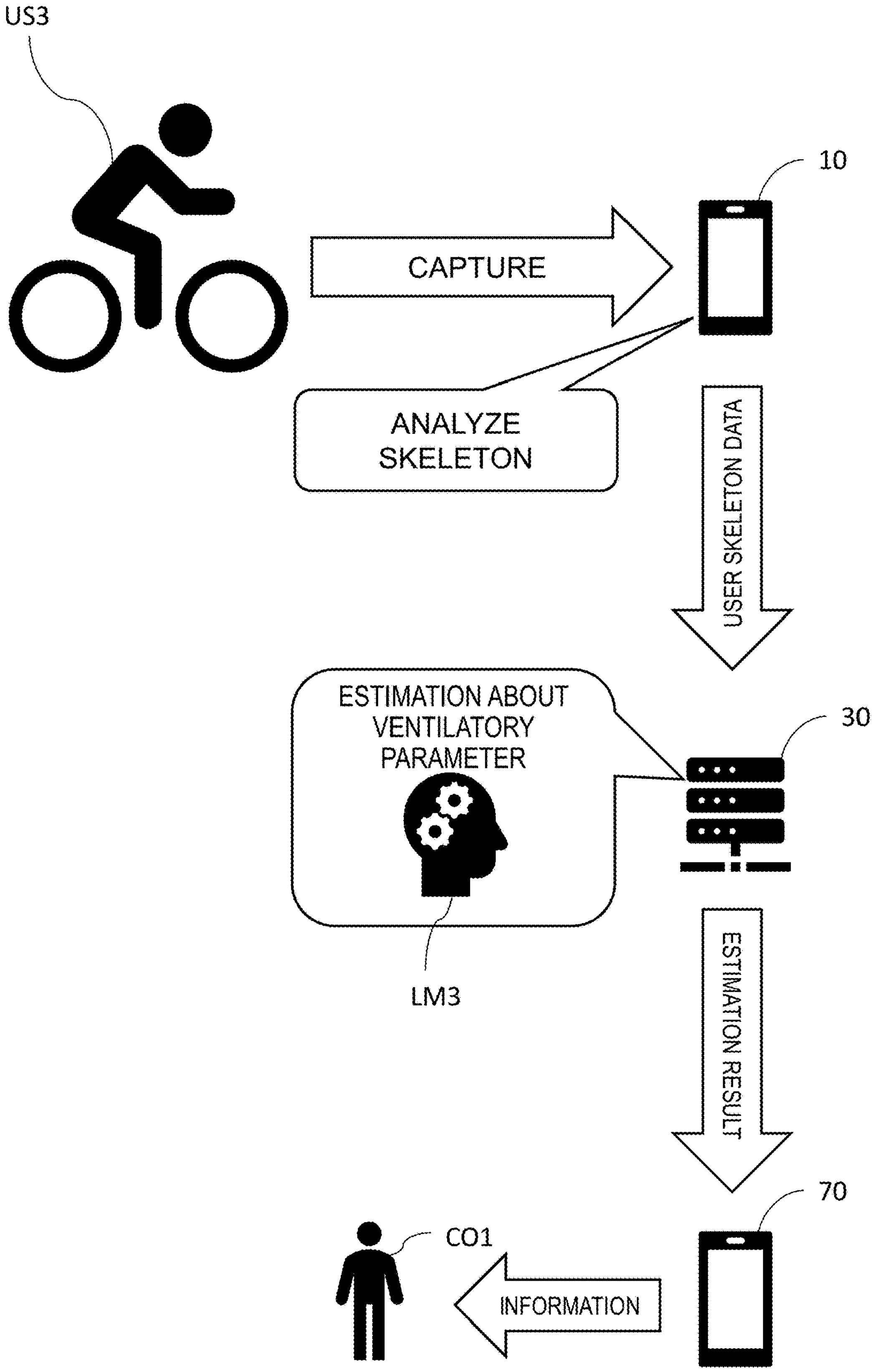
FIG. 13 is an explanatory diagram of an outline of Modification 5.

An outline of Modification 5 will be described. FIG. 13 is an explanatory diagram of the outline of Modification 5.

As illustrated in FIG. 13, the camera 16 of the client device 10 images an appearance (e.g., the whole body) of a user US3. The example illustrated in FIG. 13 is an example in which the user US3 takes exercise with a bicycle. However, the user US3 can take any type of exercise (aerobic exercise or anaerobic exercise). Alternatively, the camera 16 may image the user US3 before exercise or after exercise (including a resting state). In addition, the number of users may be more than one.

As an example, the camera 16 images the appearance of the user US3 from the front or from the front at an angle. The depth sensor 17 measures distances (depths) from the depth sensor 17 to parts of the user US3. Note that, for example, it is possible to generate three-dimensional video data by combining, for example, video data (two-dimensional) generated by the camera 16 and, for example, depth data generated by the depth sensor 17.

The client device 10 refers to at least the video data obtained from the camera 16 and analyzes a skeleton of the user. The client device 10 may further refer to the depth data obtained from the depth sensor 17 to analyze the skeleton of the user more appropriately. The client device 10 transmits, to the server 30, data on the skeleton of the user US3 (hereinafter, will be referred to as "user skeleton data") based on a result of analyzing the video data (or the video data and the depth data).

The server 30 applies a trained model LM3 (an example of the "estimation model") to the obtained user skeleton data to make an estimation about a ventilatory parameter associated with respiratory movement of the user US3. The server 30 transmits a result of the estimation (e.g., a numeric value indicating a real-time ventilatory parameter of the user US3) to the instructor's terminal 70. Alternatively, the server 30 may determine respiration data based on the result of the estimation and may make an estimation about an exercise load of the user US3 with respect to an exercise tolerance of the user US3, as described in the embodiment.

The instructor's terminal 70 presents information based on the result of the estimation about the ventilatory parameter of the user US3 to the instructor CO1. An instructor may give instructions (e.g., feedback on an individual user or all users or an adjustment of a type, an intensity, or a quantity of exercise for which the instructions are given) with the displayed information taken into consideration.

In this manner, an information processing system 1 makes the estimation about the ventilatory parameter of the user US3 by applying the trained model LM3 to input data based on the video in which the appearance of the user US3 is seen (or the video and the depths). Therefore, with the information processing system 1, it is possible to make an estimation about a ventilatory parameter associated with respiratory movement of a user without contact with the user. In addition, it is possible to present information useful in instructions by the instructor CO1 based on the result of the estimation.

(7-5-2) Training Data Set

A training data set in Modification 5 will be described. FIG. 14 is a diagram illustrating a data structure of the training data set in Modification 5.

As illustrated in FIG. 14, the training data set includes a plurality of items of training data. The items of training data are used for training or evaluating a target model. The items of training data each include a sample ID, input data, and labeled data.

The sample ID is information for identifying an item of training data.

The input data is data that is input into the target model at the time of training or evaluation. The input data corresponds to a sample question used at the time of training or evaluating the target model. As an example, the input data includes skeleton data on a subject. The skeleton data on the subject is data (e.g., feature quantities) on the skeleton of the subject at a time of capturing a subject video. As the skeleton data on the subject, the skeleton data described in the embodiment can be used.

Subject video data is data on a subject video in which an appearance of the subject is seen. The subject video is typically a video obtained by imaging the subject in such a manner that at least an upper body of the subject (specifically, at least one of shoulders, a chest, and a belly of the subject) is included in a capturing range. The subject video data can be obtained by, for example, imaging the appearance (e.g., the whole body) of the subject from the front or from the front at an angle (e.g., an angle of 45 degrees forward) with a camera (a camera built in a smartphone as an example).

The camera is capable of imaging the appearance of the subject during exercise, before exercise, and after exercise (including a resting state) to obtain the subject video data. From a viewpoint of accurately associating labeled data and the input data, the subject video data may be obtained by imaging the subject in a test about expired gas (a CPX test as an example).

The subject depth data is data on distances (depths) from a depth sensor to parts (typically at least one of shoulders, a chest, and a belly) of the subject. The subject depth data can be obtained by causing a depth sensor to act at a time of capturing a subject video.

The subject may be a person identical to a user of which an estimation about a ventilatory parameter associated with respiratory movement is made at the time of operating the information processing system 1, or the subject may be a person different from the user. When the subject is a person identical to a user, the target model may learn characteristics of the user, improving its estimation accuracy. On the other hand, allowing the subject to be a person different from the user gives such an advantage that the training data set is easily enriched. The subject may be constituted by a plurality of persons including a user or a plurality of persons not including a user.

The skeleton data specifically includes data on speeds or accelerations of the parts of the subject (can include data on changes of muscle parts used by the subject or fluctuations in bodily sensation of the subject). The skeleton data can be obtained as in the present embodiment.

The skeleton data can include data obtained by analyzing at least one of the following items about data on the speeds or accelerations of the parts of the subject.

- Movement (expansion) of shoulders, a chest (sides of the chest can be included), belly, or a combination thereof
- Inspiration time
- Expiration time
- Usage of accessory muscles of respiration The labeled data is data that corresponds to a label corresponding to input data (a sample question). The target model is trained (subjected to supervised learning) so as to output data closer to labeled data in response to input data. As an example, the labeled data includes at least one of a ventilatory parameter or an index serving as a factor for determining the ventilatory parameter. As an example, the ventilatory parameter can include at least one of the following.

- Number of ventilations
- Ventilation volume
- Ventilation rate (i.e., ventilation volume or the number of ventilations per unit time)
- Ventilation acceleration (i.e., time derivative of ventilation rate)

Note that the ventilatory parameter may be any parameter for quantitatively grasping respiratory movement and is not limited to the parameters exemplified here.

The labeled data can be obtained from, for example, a result of a test about expired gas that is performed on the subject at the time of capturing a subject video. A first example of the test about expired gas is a test that is performed while the subject who wears an expired gas analyzer takes graded exercise (e.g., using an ergometer) (typically, a CPX test). A second example of the test about expired gas is a test that is performed while the subject who wears an expired gas analyzer takes exercise with a load that is constant or can be changed as needed (e.g., body-weight exercise, gymnastics, muscle training). A third example of the test about expired gas is a test that is performed while the subject who wears an expired gas analyzer takes any type of activity. A fourth example of the test about expired gas is a test that is performed while the subject who wears an expired gas analyzer is in a resting state.

Alternatively, the labeled data can be obtained from, for example, a result of a pulmonary function test (e.g., a lung function test or a spirometry test) performed on the subject at the time of capturing a subject video. In this case, equipment for the pulmonary function test is not limited to medical equipment. Commercial test equipment may be used.

(7-5-3) Estimation Model

The estimation model to be used by the server 30 corresponds to a trained model created by supervised learning using the training data set (FIG. 14) or using a fine-tuned model or a distilled model of the trained model.

Figure 15:
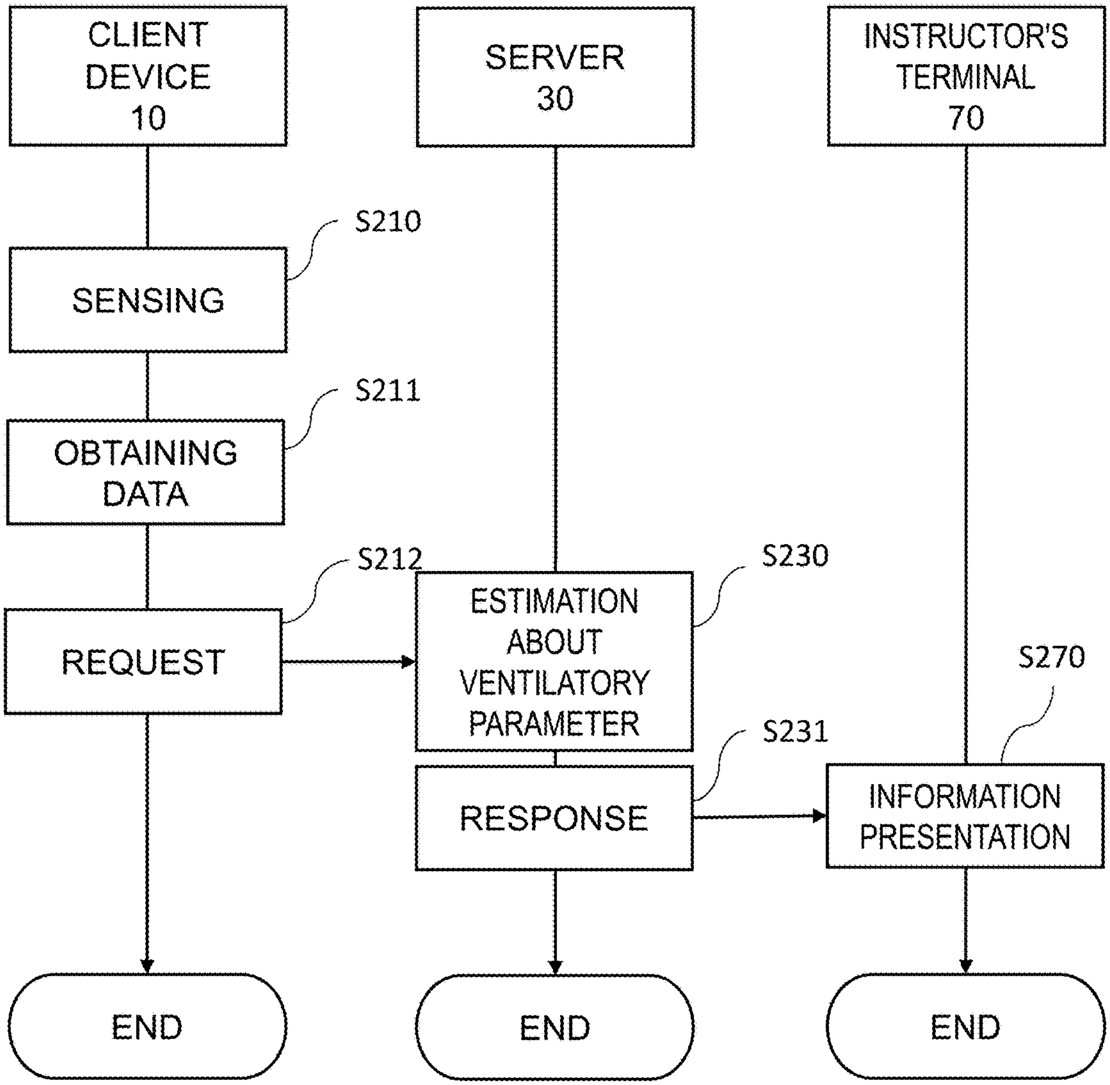
FIG. 15 is a flowchart of information processing in Modification 5.
Figure 16:
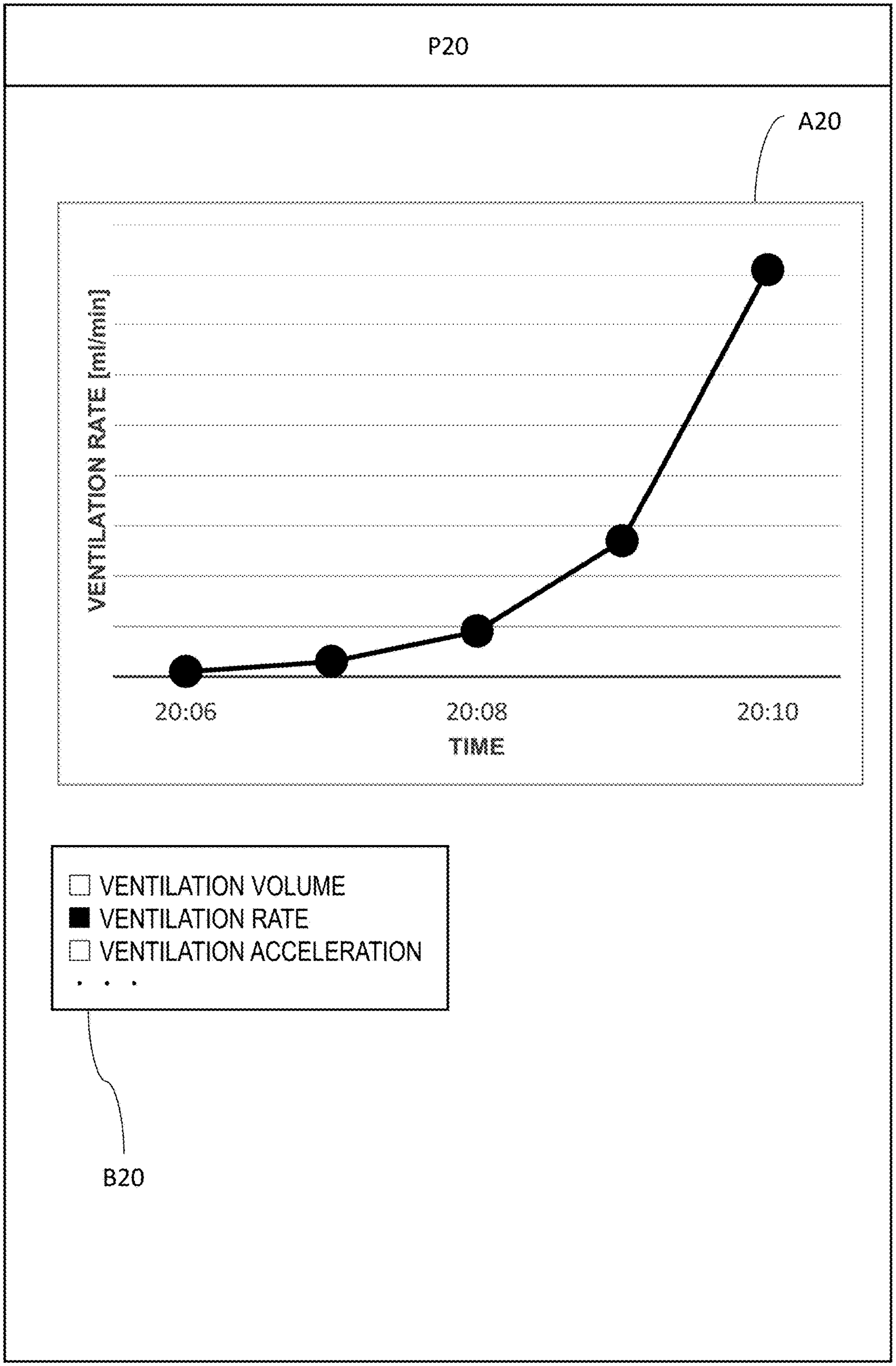
FIG. 16 is a diagram illustrating an example of a screen displayed in the information processing in Modification 5.

(7-5-4) Information Processing Information processing in Modification 5 will be described. FIG. 15 is a flowchart of the information processing in Modification 5. FIG. 16 is a diagram illustrating an example of a screen displayed in information processing in Modification 5.

The information processing is started when, for example, any one of the following start conditions is established.

- The information processing in FIG. 15 is invoked by another process (e.g., the information processing in FIG. 7).
- A user performs an operation to invoke the information processing.
- The client device 10 or the instructor's terminal 70 enters a predetermined state (e.g., a predetermined application is run).
- A predetermined date and time has arrived.
- A predetermined time period has elapsed from a predetermined event.

As illustrated in FIG. 15, the client device 10 executes SENSING (S210).

Specifically, the client device 10 enables the camera 16 to act, thus starting to capture a video of an appearance of a user (hereinafter, will be referred to as a "user video"). The user video is typically a video obtained by imaging the user in such a manner that at least an upper body of the user (specifically, at least one of shoulders, a chest, and a belly of the user) is included in a capturing range.

The client device 10 also enables the depth sensor 17 to act, thus starting to measure user depths at the time of capturing the user video. The client device 10 may further enable any sensor of the client device 10 or the wearable device 50.

Step S210 may be integrated with step S110 or may be performed independently.

After step S210, the client device 10 executes OBTAINING DATA (S211).

Specifically, the client device 10 obtains results of the sensing generated by various sensors that are enabled in step S210. For example, the client device 10 obtains user video data from the camera 16 and obtains user depth data from the depth sensor 17.

Step S211 may be integrated with step S111 or may be performed independently.

After step S211, the client device 10 executes REQUEST (S212).

Specifically, the client device 10 refers to the items of data obtained in step S211 and generates a request. The client device 10 transmits the generated request to the server 30. The request can include, for example, at least one of the following.

- The data obtained in step S211 (e.g., the user video data or the user depth data).
- Data produced by processing the data obtained in step S211.
- User skeleton data obtained by analyzing the user video data (or the user video data and the user depth data) obtained in step S211.

Step S212 may be integrated with step S112 or may be performed independently of step S112.

After step S212, the server 30 executes ESTIMATION ABOUT VENTILATORY PARAMETER (S230).

Specifically, the server 30 obtains input data for the estimation model based on the request obtained from the client device 10. The input data includes the user skeleton data as with the training data. The server 30 makes an estimation about a ventilatory parameter associated with respiratory movement of the user by applying the estimation model to the input data. As an example, the server 30 estimates at least one of the ventilatory parameters.

Step S230 may be performed independently of step S130 or may be treated as part of step S130. For example, a result of the estimation in step S230 may be used as part of the input data (e.g., the respiration data) in step S130. In a case where step S230 is treated as part of step S130, subsequent step S231 and step S270 can be omitted.

After step S230, the server 30 executes RESPONSE (S231).

Specifically, the server 30 generates a response based on a result of the estimation in step S230. The server 30 transmits the generated response to the instructor's terminal 70. As an example, the response can include at least one of the following.

- Data corresponding to a result of the estimation about the ventilatory parameter
- Data produced by processing the result of the estimation about the ventilatory parameter (e.g., data on a screen to be displayed on the display device of the instructor's terminal 70 or data to be referred to for generating the screen).

Step S231 may be integrated with step S131 or may be performed independently.

After step S231, the instructor's terminal 70 executes INFORMATION PRESENTATION (S270).

Specifically, the instructor's terminal 70 displays, on the display device of the instructor's terminal 70, information based on the response obtained from the server 30 (i.e., the result of the estimation about the ventilatory parameter of the user). An instructor may give instructions (e.g., feedback on an individual user or all users or an adjustment of a type, an intensity, or a quantity of exercise for which the instructions are given) with the displayed information taken into consideration.

Note that the information may be presented to the client device 10 or the wearable device 50 for the user in addition to or in place of the instructor's terminal 70. Alternatively, the information may be provided to a computer that can use an algorithm or an estimation model that evaluates an exercise tolerance or an exercise load of the user based on the ventilatory parameter. This computer may be within the information processing system 1 or may be outside the information processing system 1.

Step S270 may be integrated with step S170 or may be performed independently.

As an example, the instructor's terminal 70 causes the display device to display a screen P20 (FIG. 16). The screen P20 includes a display object A20 and operation objects B20.

The operation objects B20 each receive an operation of specifying a ventilatory parameter to be displayed on the display object A20. In the example in FIG. 16, the operation objects B20 correspond to checkboxes.

The display object A20 displays changes over time in the result of estimating the ventilatory parameter of the user. In the example in FIG. 16, the display object A20 displays a graph illustrating changes over time in a result of estimating every minute a ventilation rate, which is the ventilatory parameter specified from among the operation objects B20 (e.g., a result of estimating minute ventilations).

When a plurality of ventilatory parameters are specified from among the operation objects B20, the display object A20 may display graphs illustrating changes over time in results of estimating the plurality of ventilatory parameters in a superimposed manner or may display the graphs individually.

After step S212, the client device 10 finishes the information processing (FIG. 15). Note that, in a case where the estimation about the ventilatory parameter of the user is made in real time while the user video is captured, the client device 10 may return to OBTAINING DATA (S211) after step S212.

(7-5-5) Summary

As described above, the information processing system 1 in Modification 5 makes an estimation about a ventilatory parameter associated with respiratory movement of a user by applying input data based on a user video in which an appearance of the user is seen to the estimation model. Thus, it is possible to make the estimation about the ventilatory parameter associated with the respiratory movement of the user in a contactless manner.

The above description is given on the assumption that Modification 5 is combined with at least one of the present embodiment and Modification 1 to Modification 4. However, Modification 5 can be carried out independently of any one of the present embodiment or the modifications. That is, it is also possible to make an estimation about a ventilatory parameter of a user without making an estimation about an exercise load of the user with respect to an exercise tolerance of the user.

(7-6) Modification 6

Modification 6 will be described. Modification 6 is an example of making an estimation about the number of leg cycles of a user who is taking exercise based on a user video of the user.

In the present modification, definitions of some terms may be different from those in the present embodiment, but the definitions in the present modification take precedence in the description of the present modification.

(7-6-1) Outline of Modification 6

Figure 17:
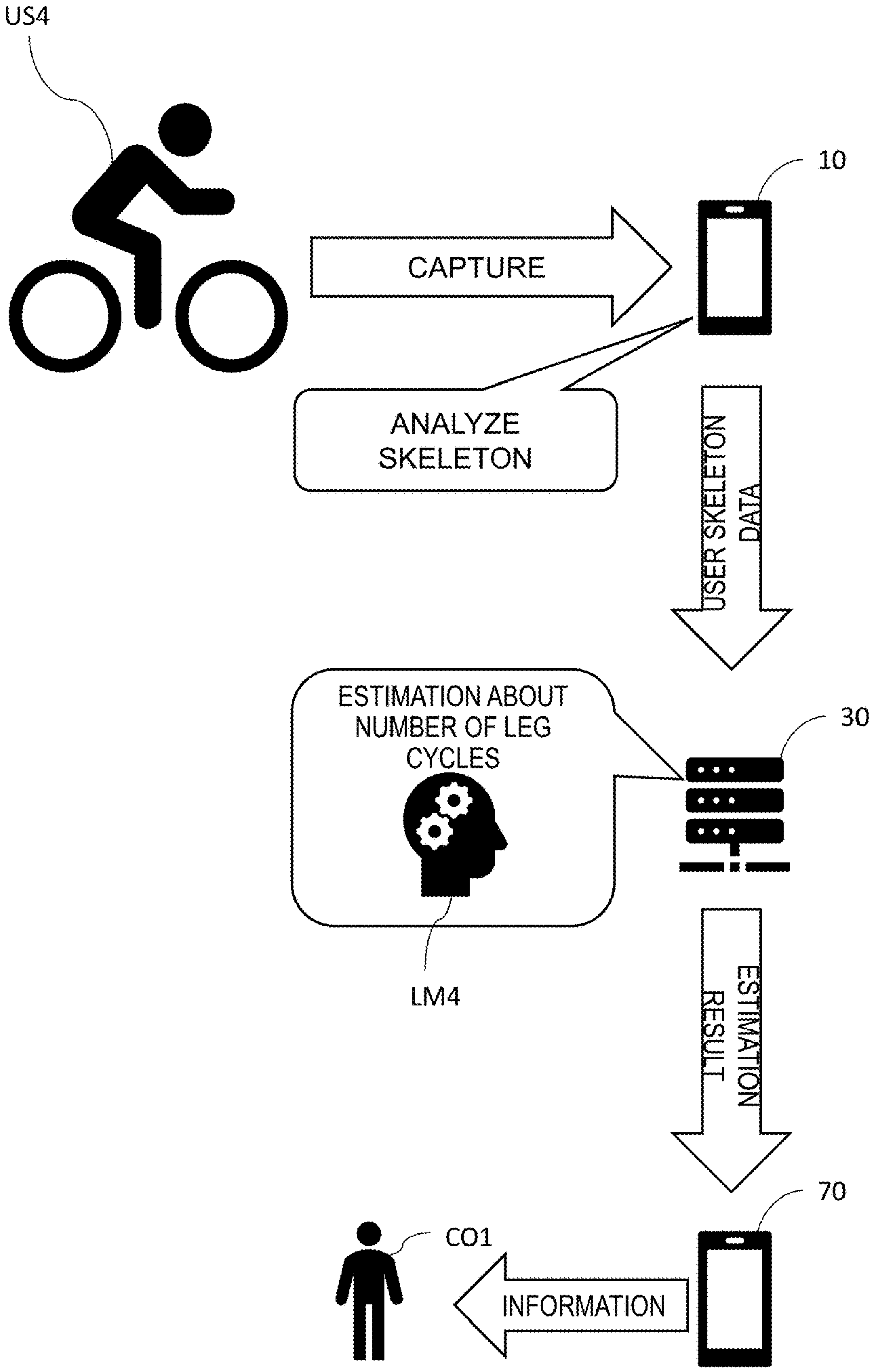
FIG. 17 is an explanatory diagram of an outline of Modification 6.

An outline of Modification 6 will be described. FIG. 17 is an explanatory diagram of the outline of Modification 6.

As illustrated in FIG. 17, the camera 16 of the client device 10 images an appearance (e.g., the whole body) of a user US4 who is taking exercise. The example illustrated in FIG. 17 is an example in which the user US4 takes exercise of pedaling (e.g., an exercise bike, an ergometer, a bicycle). However, the user US4 can take any type of exercise (aerobic exercise or anaerobic exercise) with leg cycles (i.e., periodic movement). Note that the number of users may be more than one.

As an example, the camera 16 images the appearance of the user US4 from the front or from the front at an angle. The depth sensor 17 measures distances (depths) from the depth sensor 17 to parts of the user US4. Note that, for example, it is possible to generate three-dimensional video data by combining, for example, video data (two-dimensional) generated by the camera 16 and, for example, depth data generated by the depth sensor 17.

The client device 10 refers to at least the video data obtained from the camera 16 and analyzes a skeleton of the user taking exercise. The client device 10 may further refer to the depth data obtained from the depth sensor 17 to analyze the skeleton of the user taking exercise more appropriately. The client device 10 transmits, to the server 30, user skeleton data on the skeleton of the user US4 taking exercise based on a result of analyzing the video data (or the video data and the depth data).

Likewise, the server 30 applies a trained model LM4 (an example of the "estimation model") to the obtained user skeleton data to make an estimation about the number of leg cycles of the user US4. The server 30 transmits a result of the estimation (e.g., a numeric value indicating the number of leg cycles of the user US4 per unit time) to the instructor's terminal 70. Alternatively, the server 30 may make an estimation about an absolute magnitude of an exercise load of the user US4 based on the result of the estimation.

The instructor's terminal 70 presents information based on the result of the estimation about the number of leg cycles of the user US4 to the instructor CO1. An instructor may give instructions (e.g., feedback on an individual user or all users or an adjustment of a type, an intensity, or a quantity of exercise for which the instructions are given) with the displayed information taken into consideration.

In this manner, based on the video (or the video and depths) of the user US4 who is taking exercise, an information processing system 1 makes the estimation about the number of leg cycles of the user US4. Therefore, with the information processing system 1, it is possible to estimate the number of leg cycles of the user US4 even when the user US4 takes exercise using a training machine that is not provided with means for detecting the number of leg cycles or means for outputting a result of the detection. That is, it is possible to make an estimation about the number of leg cycles of a person under various circumstances. In addition, it is possible to present information useful in instructions by the instructor CO1 based on the result of the estimation.

(7-6-2) Training Data Set

A training data set in Modification 6 will be described. FIG. 18 is a diagram illustrating a data structure of the training data set in Modification 6.

As illustrated in FIG. 18, the training data set includes a plurality of items of training data. The items of training data are used for training or evaluating a target model. The items of training data each include a sample ID, input data, and labeled data.

The sample ID is information for identifying an item of training data.

The input data is data that is input into the target model at the time of training or evaluation. The input data corresponds to a sample question used at the time of training or evaluating the target model. As an example, the input data includes skeleton data on a subject. The skeleton data on the subject is data (e.g., feature quantities) on a skeleton of the subject taking exercise.

The subject may be a person identical to a user of which an estimation about the number of leg cycles is made at the time of operating the information processing system 1, or the subject may be a person different from the user. When the subject is a person identical to a user, the target model may learn characteristics of the user, improving its estimation accuracy. On the other hand, allowing the subject to be a person different from the user gives such an advantage that the training data set is easily enriched. The subject may be constituted by a plurality of persons including a user or a plurality of persons not including a user.

The skeleton data in Modification 6 is as described in the present embodiment or Modification 5.

The subject video data is data on a subject video in which the subject taking exercise is seen. The subject video is typically a video obtained by imaging the subject in such a manner that at least a lower body of the subject (specifically, legs of the subject) is included in a capturing range. The subject video data can be obtained by, for example, imaging the appearance (e.g., the whole body) of the subject taking exercise from the front or from the front at an angle (e.g., an angle of 45 degrees forward) with a camera (a camera built in a smartphone as an example).

The subject depth data is data on distances (depths) from a depth sensor to parts (typically legs) of the subject taking exercise. The subject depth data can be obtained by causing a depth sensor to act at a time of capturing a subject video.

The labeled data is data that corresponds to a label corresponding to input data (a sample question). The target model is trained (subjected to supervised learning) so as to output data closer to labeled data in response to input data. As an example, the labeled data includes at least one of an evaluation index of the number of leg cycles or an index serving as a factor for determining the evaluation index. As an example, the evaluation index of the number of leg cycles can include at least one of the following.

- Cumulative number of cycles
- The number of cycles per unit time (i.e., cycling speed)
- Time derivative of cycling speed (i.e., cycling acceleration)

Note that the index of the number of leg cycles may be any index for grasping leg cycles (i.e., periodic movement) quantitatively and is not limited to the indices exemplified here. The index of the number of leg cycles may include an index that can be calculated based on the index described above, such as a traveling distance (a product of a cumulative number of cycles (cadence) and a traveling distance per pedaling cycle) and an exercise load.

The labeled data can be obtained by actually measuring the number of leg cycles of the subject with an appropriate sensor (e.g., a cadence sensor) at the time of capturing a subject video. Alternatively, the labeled data can be obtained by making the subject take exercise with a motion sensor (e.g., an acceleration sensor) worn on a leg or another part of the subject and making an estimation about the number of leg cycles of the subject with a predetermined algorithm or trained model based on a result of sensing with the motion sensor. Alternatively, the labeled data may be given by measuring the number of leg cycles of the subject by a person who watches a subject video.

(7-6-3) Estimation Model

The estimation model to be used by the server 30 corresponds to a trained model created by supervised learning using the training data set (FIG. 18) or using a fine-tuned model or a distilled model of the trained model.

(7-6-4) Information Processing

Figure 19:
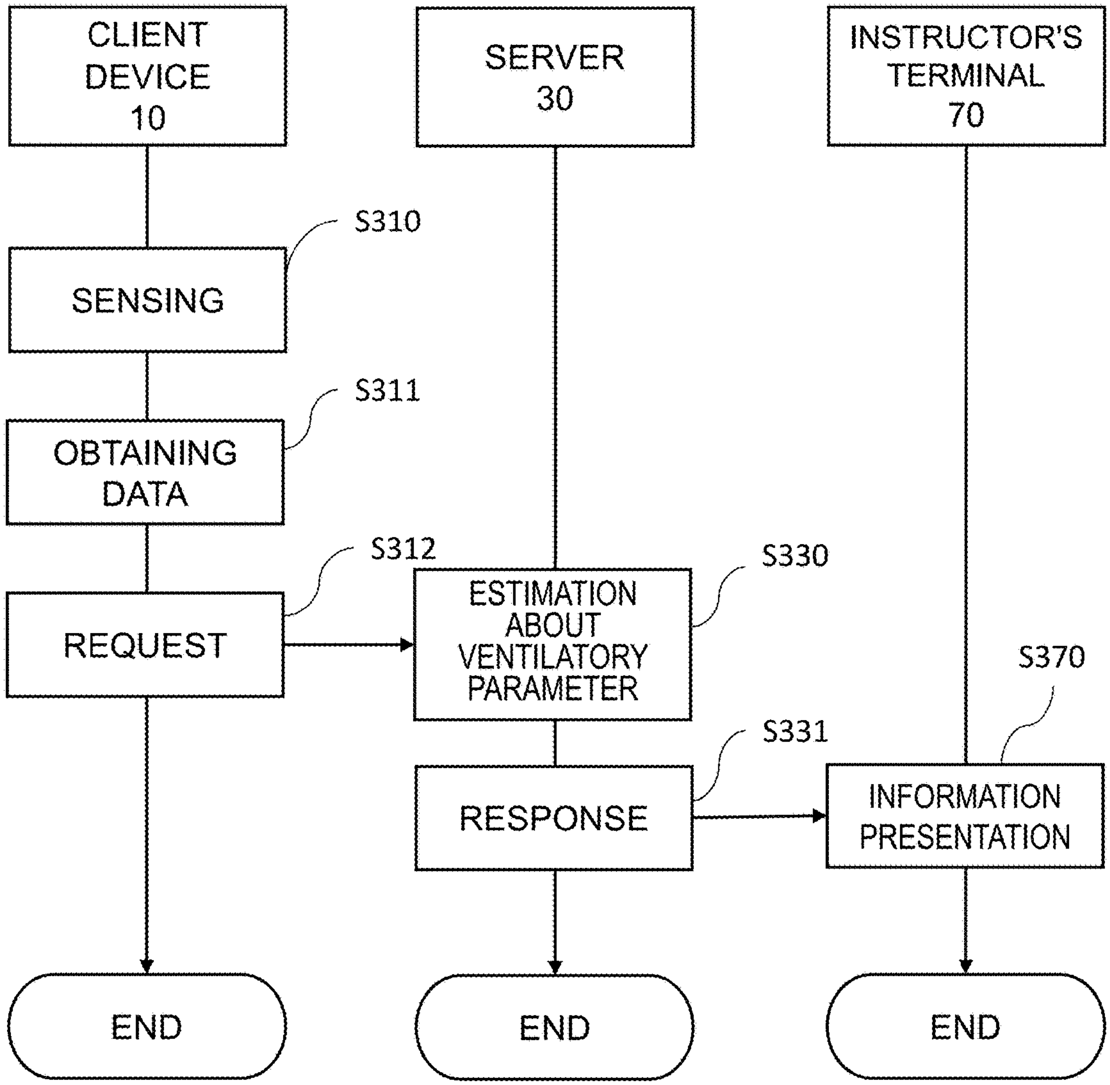
FIG. 19 is a flowchart of information processing in Modification 6.
Figure 20:
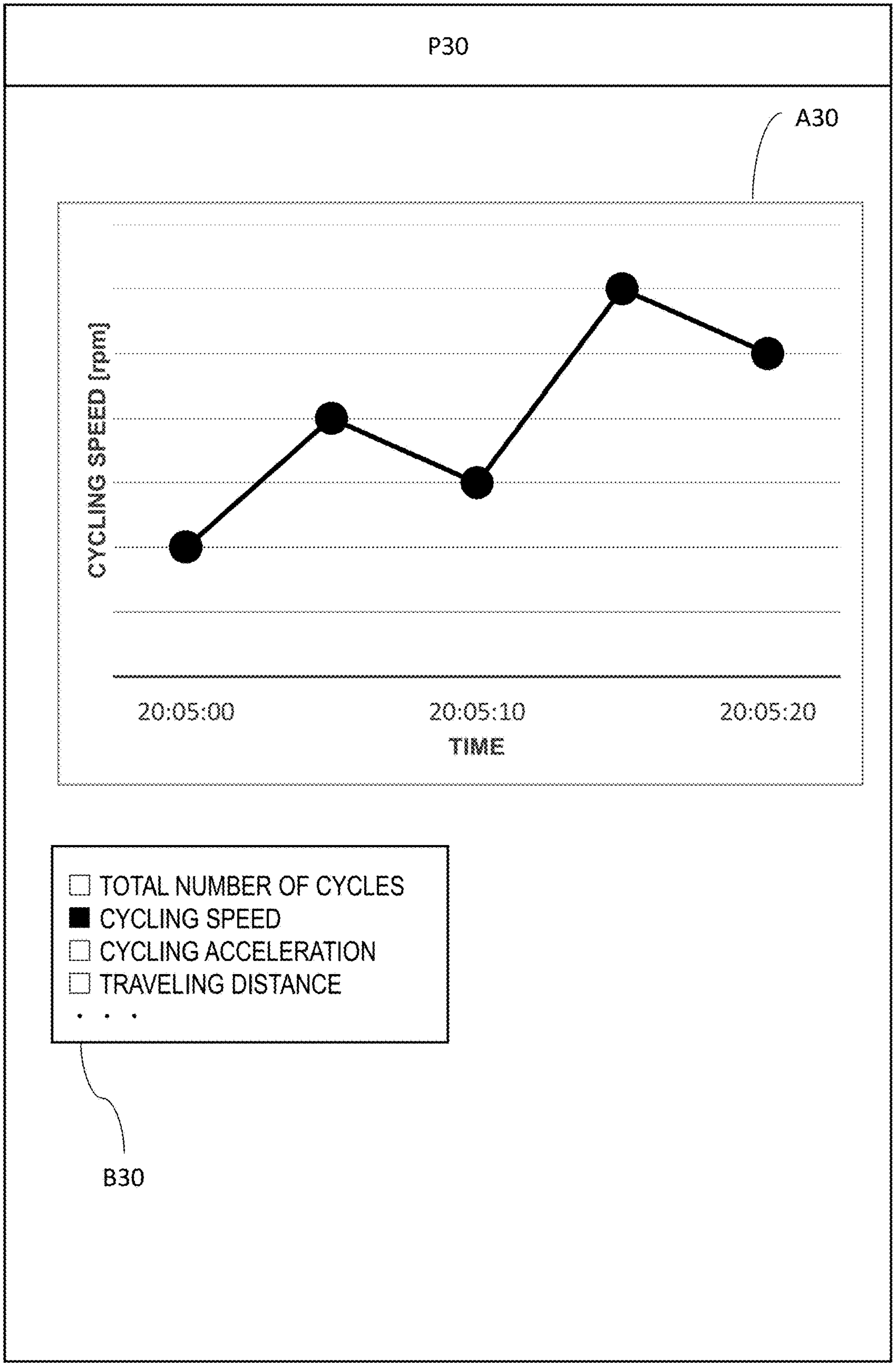
FIG. 20 is a diagram illustrating an example of a screen displayed in the information processing in Modification 6.

Information processing in Modification 6 will be described. FIG. 19 is a flowchart of the information processing in Modification 6. FIG. 20 is a diagram illustrating an example of a screen displayed in information processing in Modification 6.

The information processing is started when, for example, any one of the following start conditions is established.

- The information processing in FIG. 19 is invoked by another process (e.g., the information processing in FIG. 7 or FIG. 15).
- A user performs an operation to invoke the information processing.
- The client device 10 or the instructor's terminal 70 enters a predetermined state (e.g., a predetermined application is run).
- A predetermined date and time has arrived.
- A predetermined time period has elapsed from a predetermined event.

As illustrated in FIG. 19, the client device 10 executes SENSING (S310).

Specifically, the client device 10 enables the camera 16 to act, thus starting to capture a video of a user who is taking exercise (hereinafter, will be referred to as a "user video"). The user video is typically a video obtained by imaging the user in such a manner that at least a lower body of the user (specifically, legs of the user) is included in a capturing range.

The client device 10 also enables the depth sensor 17 to act, thus starting to measure user depths. The client device 10 may further enable any sensor of the client device 10 or the wearable device 50.

Step S310 may be integrated with step S110 or step S210 or may be performed independently.

After step S310, the client device 10 executes OBTAINING DATA (S311).

Specifically, the client device 10 obtains results of the sensing generated by various sensors that are enabled in step S310. For example, the client device 10 obtains user video data from the camera 16 and obtains user depth data from the depth sensor 17.

Step S311 may be integrated with step S111 or step S211 or may be performed independently.

After step S311, the client device 10 executes REQUEST (S312).

Specifically, the client device 10 refers to the items of data obtained in step S311 and generates a request. The client device 10 transmits the generated request to the server 30. The request can include, for example, at least one of the following.

- The data obtained in step S311 (e.g., the user video data or the user depth data).
- Data produced by processing the data obtained in step S311.
- User skeleton data obtained by analyzing the user video data (or the user video data and the user depth data) obtained in step S311.

Step S312 may be integrated with step S112 or step S212 or may be performed independently.

After step S312, the server 30 executes ESTIMATION ABOUT NUMBER OF LEG CYCLES (S330).

Specifically, the server 30 obtains input data for the estimation model based on the request obtained from the client device 10. The input data includes the user skeleton data as with the training data. The server 30 makes the estimation about the number of leg cycles of the user by applying the estimation model to the input data. As an example, the server 30 makes an estimation about at least one of evaluation indices of the number of leg cycles of the user.

Step S330 may be performed independently of step S130 or step S230 or may be treated as part of step S130. For example, a result of the estimation in step S330 may be used as part of the input data in step S130 or used for correcting the estimated absolute magnitude of an exercise load. In a case where step S330 is treated as part of step S130, subsequent step S331 and step S370 can be omitted.

After step S330, the server 30 executes RESPONSE (S331).

Specifically, the server 30 generates a response based on a result of the estimation in step S330. The server 30 transmits the generated response to the instructor's terminal 70. As an example, the response can include at least one of the following.

- Data corresponding to a result of an estimation about the number of leg cycles
- Data produced by processing the result of an estimation about the number of leg cycles (e.g., data on a screen to be displayed on the display device of the instructor's terminal 70 or data to be referred to for generating the screen).

Step S331 may be integrated with step S131 or step S231 or may be performed independently.

After step S331, the instructor's terminal 70 executes INFORMATION PRESENTATION (S370).

Specifically, the instructor's terminal 70 displays, on the display device, information based on the response obtained from the server 30 (i.e., the result of the estimation about the number of leg cycles of the user). An instructor may give instructions (e.g., feedback on an individual user or all users or an adjustment of a type, an intensity, or a quantity of exercise for which the instructions are given) with the displayed information taken into consideration.

Note that the information may be presented to the client device 10 or the wearable device 50 for the user in addition to or in place of the instructor's terminal 70. Alternatively, as the information, content for staging exercise experience of the user (e.g., a video of a scene or a video game that is controlled in accordance with the result of the estimation about the number of leg cycles) may be presented. Such content may be presented via a display device of an external device such as an HMD or another output device in place of the display device 15.

Step S370 may be integrated with step S170 or step S270 or may be performed independently.

As an example, the instructor's terminal 70 causes the display device to display a screen P30 (FIG. 20). The screen P30 includes a display object A30 and operation objects B30.

The operation objects B30 each receive an operation of specifying an evaluation index about the number of leg cycles to be displayed on the display object A30. In the example in FIG. 20, the operation objects B30 correspond to checkboxes.

The display object A30 displays changes over time in the result of estimating the evaluation index described above. In the example in FIG. 20, the display object A30 displays a graph illustrating changes over time in a result of estimating every five seconds a cycling speed (rpm), which is the evaluation index specified from among the operation objects B30.

When a plurality of evaluation indices are specified from among the operation objects B30, the display object A30 may display graphs illustrating changes over time in results of estimating the plurality of evaluation indices in a superimposed manner or may display the graphs individually.

After step S312, the client device 10 finishes the information processing (FIG. 19). Note that, in a case where the estimation about the number of leg cycles of the user is made in real time while the user is taking exercise, the client device 10 may return to OBTAINING DATA (S311) after step S312.

(7-6-5) Summary

As described above, based on a video of a user who is taking exercise, the information processing system 1 in Modification 6 makes the estimation about the number of leg cycles of the user. Thus, it is possible to estimate the number of leg cycles of the user even when the user takes exercise using a training machine that is not provided with means for detecting the number of leg cycles or means for outputting a result of the detection. That is, it is possible to make an estimation about the number of leg cycles of a person under various circumstances.

The above description is given on the assumption that Modification 6 is combined with at least one of the present embodiment and Modification 1 to Modification 5. However, Modification 6 can be carried out independently of any one of the present embodiment or the modifications. That is, it is also possible to make an estimation about the number of leg cycles of a user without making an estimation about an exercise load of the user with respect to an exercise tolerance of the user.

(7-7) Modification 7

Modification 7 will be described. Modification 7 is an example of effectively urging a user to change an activity.

(7-7-1) Outline of Modification 7

Figure 21:
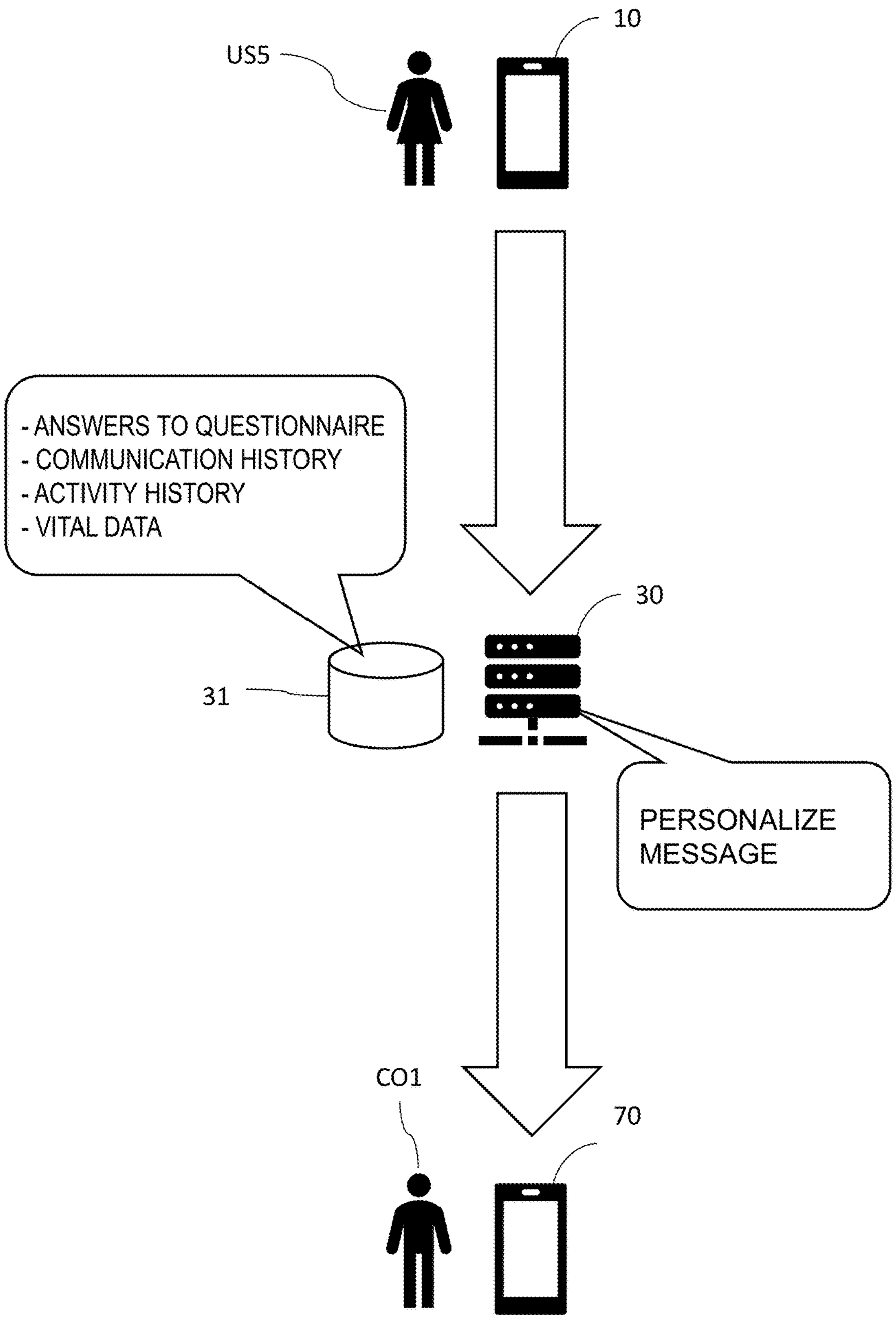
FIG. 21 is an explanatory diagram of an outline of Modification 7.

An outline of Modification 7 will be described. FIG. 21 is an explanatory diagram of the outline of Modification 7.

As illustrated in FIG. 21, the server 30 collects personal data on a user US5 and accumulates the personal data in the storage device 31. The personal data can include, for example, at least one of the following.

- Answers to questionnaire
- Communication history
- Activity history
- Vital data Answers to a questionnaire are answers from the user US5 to, for example, a questionnaire for determining a character, a temperament, or a personality of a person. The questionnaire may be issued only once at the beginning of, for example, a (cardiac) rehabilitation program or an exercise training program or may be repeatedly issued at intervals.

The communication history is a history about communication performed between the user US5 and the instructor CO1, communication performed between the user US5 and another user (program participant) or communication performed between the user US5 and an information processing system 1. Means for the communication is not limited to particular means and may be chat, mail, voice call, video call, or direct talk. The communication history can include at least one of the following.

Content of communication (e.g., meanings or keywords)

Frequency, time frame, or the number of times of performing communication

Quantity of communication (e.g., the number of characters or duration)

Date and time of communication performed last

The activity history is a history about activities of the user US5. The activities may include exercise in a program in which the user US5 participates or may include an activity outside a program (e.g., a voluntary exercise, an action in daily life, sleeping, or eating and drinking by the user US5). The activity history can include at least one of the following.

Content of activity (e.g., a type of exercise or details of an activity (details of diet as an example))

Frequency, time frame, or the number of times of performing activity

Quantity of activity (e.g., a duration of an activity or a cumulative value of exercise load estimated by one of the embodiment and the modifications described above)

Date and time of activity performed last

The vital data is physiological information on the user US5. The vital data may be measured by the wearable device 50. The vital data can include data on, for example, a heart rate, a blood glucose level, an oxygen saturation, a blood pressure, or a weight.

The server 30 refers to the personal data on the user US5 accumulated in the storage device 31 and generates a message that is customized for the user US5. Specifically, based on the personal data on the user US5, the server 30 generates a message customized for the user US5 with a predetermined algorithm or trained model. The server 30 transmits the generated message to the instructor's terminal 70. In addition, based on the personal data on the user US5, the server 30 may determine a timing to transmit the generated message to the user US5 with a predetermined algorithm or trained model. Such a message includes content that effectively urges the user US5 to change an activity about, for example, at least one of eating and drinking, exercise, or sleeping by the user US5.

As an example, the message can include at least one of the following content.

Change in details of eating and drinking, exercise, or sleeping by the user US5 (e.g., presenting a recommended food, dish, type of exercise, or sleeping environment)

Change in frequency or time frame of eating and drinking, exercise, or sleeping by the user US5 (e.g., recommending having breakfast, recommending not eating and drinking at midnight)

Change in quantity of eating and drinking, exercise, or sleeping by the user US5 (e.g., recommending reducing salt intake)

Urging the user US5 to eat and drink, take exercise, or sleep (e.g., notifying the user US5 of arrival of a suitable time for eating and drinking, taking exercise, or sleeping, or recommending taking exercise again after a lapse of a predetermined time period from taking exercise last time)

The instructor's terminal 70 presents information based on the message obtained from the server 30 to the instructor CO1. Referring to the presented information, the instructor's terminal 70 communicates with the user US5 by, for example, chat, mail, voice call, video call, or direct talk.

In this manner, the information processing system 1 generates a message customized for the user US5 based on the personal data on the user US5 and presents the message to the instructor CO1. Therefore, with the information processing system 1, it is possible for the instructor CO1 to perform communication suitable for a character or an activity pattern of the user US5 without making a detailed investigation. That is, it is possible to effectively urge the user US5 to change an activity while keeping a communication cost low, thus enhancing an effect of a program in which the user US5 participates.

In Modification 7, an example in which the server 30 transmits a generated message to the instructor's terminal 70 is described. However, the server 30 may transmit the message to the client device 10. Thus, the user US5 is effectively urged to change an activity with a message obtained from the server 30 even without an instructor.

In Modification 7, an example in which the server 30 collects personal data is shown. The personal data may be transmitted to the instructor's terminal 70. Thus, an instructor can give instructors with consideration given to, for example, vital data or transitions in an activity history of a user (e.g., instructions about health, exercise, life, sleeping, or diet).

(8) Application Example

The technique described in the present embodiment or each modification is suitable for a heart disease treatment application described below, for example.

For example, utilizing the heart disease treatment application, a user (e.g., a patient with heart disease) can receive exercise therapy and lifestyle guidance at home with minimized attending a medical institution, without placing an ergometer, which is expensive and takes a lot of space, at home. That is, it is possible for the user to lessen a burden of continuing exercise therapy and improvement in lifestyle and to relieve a symptom of heart disease of the user. In addition, by using the technique of changing an activity described in Modification 7 described above, it is possible for the user to further lessen a burden of continuing exercise therapy and improvement in lifestyle.

The heart disease treatment application provides, for example, a 15-minute warm-up, a 30-minute aerobic exercise, and a 15-minute cooling-down in this order as a cardiac rehabilitation menu.

During the warm-up or the cooling-down, a screen for gymnastics is displayed on the display device 15 of the client device 10. The screen for gymnastics can include, for example, the following objects.

Display object displaying an exemplary video of gymnastics

Object displaying at least one of a video of a user captured with an in-camera of the client device 10 and a result of skeleton detection based on the video Object displaying a heart rate of a user measured with the heartbeat sensor 56 of the wearable device 50

Object displaying information based on at least one of (1) an exercise tolerance, (2) an exercise load of a user with respect to an exercise tolerance, (3) a sign of heart failure, (4) mental conditions, (5) a ventilatory parameter, or (6) the number of leg cycles that are estimated by the present embodiment or the modifications Here, the exemplary video of gymnastics may be, for example, a pre-recorded video or may be a live video of a demonstration by an instructor.

During the aerobic exercise, a screen corresponding to a type of the aerobic exercise is displayed on the display device 15 of the client device 10.

Specifically, the screen can include, for example, the following objects in a case of performing gymnastics (can include aerobics, body-weight exercise, muscle training) as the aerobic exercise.

- Display object displaying an exemplary video of gymnastics
- Object displaying at least one of a video of a user captured with an in-camera of the client device 10 and a result of skeleton detection based on the video
- Object displaying a heart rate of a user measured with the heartbeat sensor 56 of the wearable device 50
- Object displaying information based on at least one of (1) an exercise tolerance, (2) an exercise load of a user with respect to an exercise tolerance, (3) a sign of heart failure, (4) mental conditions, (5) a ventilatory parameter, or (6) the number of leg cycles that are estimated by the present embodiment or the modifications Here, the exemplary video of gymnastics may be, for example, a pre-recorded video or may be a live video of a demonstration by an instructor. Content of the exemplary video may be automatically selected in accordance with an exercise tolerance (e.g., an anaerobic threshold) or an exercise load of a user. Specifically, for a user whose anaerobic threshold is high (e.g., 5 METs or higher), a leg raise with a high load (e.g., high leg raise 10 times/30 seconds and squat in between) is selected, for a user whose anaerobic threshold is medium (e.g., 3 to 5 METs), a leg raise with a medium load (e.g., high leg raise 8 times/30 seconds) is selected, and a user whose anaerobic threshold is low (e.g., lower than 3 METs), a leg raise with a low load (e.g., low leg raise 6 times/30 seconds) is selected. Thus, it is possible to further enhance an effect of heart disease treatment.

Alternatively, the screen can include, for example, the following objects in a case of taking exercise other than gymnastics (e.g., walking, exercise bike, bicycle, treadmill, jogging, etc.) as the aerobic exercise.

- Display object displaying a remaining time of the aerobic exercise
- Operation object for an operation of stopping/resuming a timer for measuring the remaining time described above
- Display object displaying a quantity of exercise of the user (e.g., the number of steps or a travel distance of the user measured by the client device 10 or the wearable device 50)
- Object displaying an image (e.g., a natural or artificial scenic image) that changes in accordance with the quantity of exercise of the user described above
- Object displaying a heart rate of a user measured with the heartbeat sensor 56 of the wearable device 50
- Object displaying information based on at least one of (1) an exercise tolerance, (2) an exercise load of a user with respect to an exercise tolerance, (3) a sign of heart failure, (4) mental conditions, (5) a ventilatory parameter, or (6) the number of leg cycles that are estimated by the present embodiment or the modifications The heart disease treatment application manages the following information for each user and can be utilized for detecting abnormality or optimizing instructions (e.g., a change of an activity).

- User attribute information
- Lifestyle information
- Outcome measures
- Application usage information
- Support detail information from medical professional The user attribute information is information on attributes of the user. The user attribute information can include information on, for example, an age, a sex, medication, a job, insurer information, a patient referral document, a history of medical examination results, a family medical history, members of the same family, character traits, or the like of the user. The information on character traits is determined based on, for example, a result of a character analysis questionnaire.

The lifestyle information is information on a lifestyle of the user. The lifestyle information can include information on, for example, a working pattern, a quantity of physical activity, hours of sleep, a picture of diet, a salt intake, a weight, a home blood pressure, drinking habit, smoking habit, or the like of the user.

The outcome measures are information on outcomes of the user. The outcome measures can include information on, for example, a weight, a blood pressure, results of a blood test (three cholesterols, blood sugar/HbA1c), a lifestyle (a quantity of physical activity, a diet habit, a drinking habit, a smoking habit), or the like of the user.

The application usage information is information on usage of the application by the user. The application usage information can include information on, for example, a device used by the user, a frequency of use, a frequency of data input, a record of browsing teaching materials, the number of chats, details of chats, or the like. The details of chats may be, for example, a result of analyzing frequently appearing words in the chats.

Support detail information from a medical professional is information about details of support by a medical professional to the user. The support detail information from a medical professional can include, for example, information on audio recording of a telephone interview, details of support by chat, details of a set target activity, or the like.

Specifically, the user is classified into one of a plurality of types based on character traits, a total time, details, a time frame of usage of the application, or details of chat, and optimal instructions can be given for the type.

As a first example, a proportion of intervention by a person for instructions (i.e., an instructor) may be changed in accordance with the type of the user. For example, for a user of a type of a person who is less industrious as character traits, the proportion of intervention by a person for instructions is increased to positively intervene in an individual case of the user, so that the user is effectively motivated to continue the treatment.

As a second example, an activity, diet, exercise, or sleep program that is suitable to the type of the user is provided, so that the user is effectively motivated to continue the treatment.

As a third example, a frequency of notifications of personalized messages may be changed in accordance with the type of the user. For example, for a user of a type of a person who easily feels lonely, the frequency of the notifications is increased, so that the user is effectively motivated to continue the treatment.

The heart disease treatment application described above can be diverted to, for example, an online cardiac rehabilitation application. In diverting the heart disease treatment application, some of functions can be subjected to alteration (e.g., addition, change, deletion).

By utilizing the online cardiac rehabilitation application, a user (e.g., a patient with heart disease, a patient after cardiac treatment, etc.) can participate in a cardiac rehabilitation program at home with minimized attending a medical institution or a rehabilitation facility, without placing an ergometer, which is expensive and takes a lot of space, at home. That is, it is possible for the user to lessen a burden of continuing cardiac rehabilitation and to reduce recurrence of heart disease or a hospitalization risk of the user. Specifically, guidelines in Japan, Europe, and the United States classify the cardiac rehabilitation as a highest recommendation class as a treatment for a patient with ischemic heart disease and heart failure.

The heart disease treatment application described above can be diverted to, for example, a treatment application for hypertension or another lifestyle-related disease, or obesity (hereinafter, will be referred to as "lifestyle-related disease, etc."). In diverting the heart disease treatment application, some of functions can be subjected to alteration (e.g., addition, change, deletion).

For example, utilizing the treatment application for the lifestyle-related disease, etc., a user (e.g., a patient with the lifestyle-related disease, etc.) can receive exercise therapy and lifestyle guidance at home with minimized attending a medical institution, without placing an ergometer, which is expensive and takes a lot of space, at home. That is, it is possible for the user to lessen a burden of continuing exercise therapy and improvement in lifestyle and to relieve a symptom of the lifestyle-related disease, etc. of the user. In addition, by using the technique of changing an activity described in Modification 7 described above, it is possible for the user to further lessen a burden of continuing exercise therapy and improvement in lifestyle.

The heart disease treatment application described above can be diverted to, for example, a fitness application. In diverting the heart disease treatment application, some of functions can be subjected to alteration (e.g., addition, change, deletion).

For example, utilizing the fitness application, a user can receive instructions about fitness and lifestyle at home with minimized attending a fitness center, without placing an ergometer, which is expensive and takes a lot of space, at home. That is, it is possible for the user to lessen a burden of continuing fitness and improvement in lifestyle and to promote health of the user. In addition, by using the technique of changing an activity described in Modification 7 described above, it is possible for the user to further lessen a burden of continuing fitness and improvement in lifestyle.

(9) Other Modifications

The storage device 11 may be connected to the client device 10 via a network NW. The display device 15 may be built in the client device 10. The storage device 31 may be connected to the server 30 via the network NW.

The examples in which the information processing system in each of the embodiment and Modification 1 is implemented in a form of a client/server system are shown. However, the information processing system in each of the embodiment and Modification 1 can be implemented in a form of a peer-to-peer system or a stand-alone computer. As an example, the client device 10 or the instructor's terminal 70 may make an estimation about an exercise load of a user with respect to an exercise tolerance of the user using the estimation model.

The steps in the information processing described above can be executed by any one of the client device 10, the server 30, and the instructor's terminal 70. As an example, in place of the client device 10, the server 30 may obtain at least part of the user data or the user skeleton data by analyzing a user video (or the user video and user depths).

In the above description, an example in which a screen based on a response from the server 30 is displayed on the display device of the instructor's terminal 70 is shown. However, the present embodiment or each modification is applicable to a case where there is neither instructor nor instructor's terminal 70. That is, the screen based on the response from the server 30 may be displayed on the display device 15 of the client device 10 or the display device 55 of the wearable device 50. In addition, a notification including content of the same as or similar to a predefined message that is transmitted by selecting one of the operation objects B10*b*, B11*b*, B12*b*, and B13*b* by an instructor may be transmitted as a response to the client device 10. Thus, a user can take exercise, receiving appropriate instructions from the system even when there is no instructor.

In the above description, an example in which the estimation model estimates an index indicating an exercise load with respect to an evaluation index of exercise tolerance is shown. However, as the evaluation index of exercise tolerance, a value determined by actual measurement may be used. In this case, the estimation model may estimate, for example, an index indicating an absolute magnitude of an exercise load. Based on a result of the estimation and an evaluation index of exercise tolerance determined by actual measurement, an index indicating an exercise load with respect to the evaluation index of exercise tolerance can be calculated.

In the above description, an example in which a user video is captured with the camera 16 of the client device 10 is shown. However, the user video may be captured with a camera other than the camera 16. An example in which user depths are measured with the depth sensor 17 of the client device 10 is shown. However, the user depths may be measured with a depth sensor other than the depth sensor 17.

In the above description, an example in which a heart rate of a user is measured with the wearable device 50 is shown. However, the heart rate can be obtained by analyzing (e.g., Remote Photo-plethysmography (rPPG) analysis) video data or a result of analyzing the video data (e.g., skin color data). The heart rate may be analyzed with a trained model that is built using a machine learning technology. Alternatively, a user wearing electrodes for an electrocardiogram monitor may be made to take exercise to enable the electrocardiogram monitor to measure a heart rate of the user. In these modifications, a user need not wear a wearable device 50 for measuring a heart rate.

The wearable device 50 can include a sensor for measuring at least one of the following items in place of or in addition to the heartbeat sensor 56 and the acceleration sensor 57.

Glucose level

Oxygen saturation

A result of measurement from each sensor can be used as appropriate for generating the input data, making an estimation about an exercise load or a ventilatory parameter, presenting information based on a result of the estimation, or another situation. As an example, a result of measurement of the glucose level can be referred to for evaluating, for example, an energy consumption, an exercise load converted to an oxygen consumption. As another example, a result of measuring an acceleration can be used for, for example, determining a score of exercise (e.g., gymnastics) of a user.

As part of the input data for the estimation model described in the present embodiment or each modification, acceleration data can be used as well. Alternatively, the acceleration data may be referred to to analyze a skeleton of a user. The acceleration data may be obtained with the acceleration sensor 19 or the acceleration sensor 57 at the time of capturing a user video.

As part of the input data for the estimation model described in the present embodiment or each modification, oxygen saturation data can be used as well. The oxygen saturation data can be obtained by, for example, making a user wear a wearable device including a sensor that can measure a blood oxygenation level at the time of capturing a user video (e.g., an optical sensor), or making the user wear a pulse oximeter. The oxygen saturation data may be estimated by, for example, performing rPPG analysis on user video data.

In the above description, an example in which information based on a result of an estimation about an exercise load of a user with respect to an exercise tolerance of the user is presented is shown. The information processing system 1 may analyze the exercise load of the user with respect to the exercise tolerance of the user or changes over time in an absolute magnitude of the exercise load of the user and present information based on a result of the analysis. As an example, the information processing system 1 may analyze whether an exercise load of a user with respect to an exercise tolerance of the user or an absolute magnitude of the exercise load of the user is high, at the same level (appropriate), or low compared with that in previous or usual exercise. Thus, it is possible to grasp changes over time in the exercise load of the user.

The information processing system 1 in the present embodiment or each modification can be applied to a video game of which game progress is controlled in accordance with body movements of a player. The video game may be a minigame that can be played during execution of the treatment application, the rehabilitation application, or the fitness application mentioned above. As an example, the information processing system 1 may make an estimation about an exercise load of a user with respect to an exercise tolerance of the user while the user is playing the game and determine one of the following in accordance with a result of the estimation (e.g., a numeric value indicating the exercise load with respect to the exercise tolerance of the user). Thus, it is possible to enhance an effect of the video game on promotion of health of the user.

- Quality (e.g., a difficulty) or a quantity of a task relating to the video game (e.g., a stage, a mission, a quest) to be provided to a user
- Quality (e.g., a type) or a quantity of incentive relating to the video game (e.g., in-game currency, an item, a bonus) to be provided to a user
- Game parameter about progress of the video game (e.g., a score, damage)

The information processing system 1 in the present embodiment or each modification can be applied to a video game of which game progress is controlled in accordance with body movements of a player. The video game may be a minigame that can be played during execution of the treatment application, the rehabilitation application, or the fitness application mentioned above. As an example, the information processing system 1 makes an estimation about a skeleton of a user based on a user video while the user is playing the game. The estimation about the skeleton of the user may be made based further on at least either user depths or a user acceleration, in addition to the user video. Based on a result of the estimation about the skeleton of the user, the information processing system 1 evaluates how much a form of the user in exercise (e.g., gymnastics) matches with an ideal form (a model). The information processing system 1 may determine any one of the following in accordance with a result of the evaluation (e.g., a numeric value indicating a degree of how much the form of the user matches with the ideal form). Thus, it is possible to enhance an effect of the video game on promotion of health of the user.

- Quality (e.g., a difficulty) or a quantity of a task relating to the video game (e.g., a stage, a mission, a quest) to be provided to a user
- Quality (e.g., a type) or a quantity of incentive relating to the video game (e.g., in-game currency, an item, a bonus) to be provided to a user
- Game parameter about progress of the video game (e.g., a score, damage)

The microphone 18 or a microphone of the wearable device 50 (a microphone included in or connected to the wearable device 50) may receive a sound wave emitted by a user at the time of capturing a user video and generate sound data. The sound data can constitute the input data for the estimation model described in the present embodiment or the modifications. Sound emitted by the user is, for example, at least one of the following.

- Sound wave emitted by leg cycles of the user (e.g., sound produced by a pedal or a driving unit connected to a pedal)
- Sound produced by respiration or utterance of the user.

In the above description, the CPX test is exemplified as a test about expired gas. In the CPX test, a gradually increasing exercise burden is imposed on a target person of the test. However, the exercise burden imposed on a user at the time of capturing a user video need not be gradually increased. Specifically, a real-time exercise load can be estimated in a state where a constant exercise burden or an exercise burden that can be changed as needed is imposed on a user. For example, an exercise taken by the user may be body-weight exercise, gymnastics, or muscle training.

In Modification 6, an example in which an estimation about the number of leg cycles is made is shown. However, the number of leg cycles can be actually measured with a cadence sensor that is attached to a pedal of an exercise bike or bicycle used by a user. By presenting information based on an actually measured value of the number of leg cycles, an instructor or a user can grasp the number of leg cycles of the user.

In Modification 6, leg cycles by pedaling are exemplified. However, the leg cycles are not limited to a circular motion such as pedaling and can include periodic motions, such as marching, in general. In summary, the number of leg cycles can be interpreted as marching or the number of steps as appropriate.

In Modification 1, the estimation model for estimating an exercise load is applied to the input data based on health conditions is shown. However, a plurality of estimation models can be built based on (at least some of) health conditions of a subject. In this case, (at least some of) health conditions of a user may be referred to to select an estimation model. In this advanced modification, the input data for the estimation models may be data that is not based on the health conditions of the user or may be data based on the health conditions of the user and a user video.

Furthermore, Modification 1 can be applied to alteration of the input data for the estimation model in Modification 5 or Modification 6. In short, the input data for the estimation model in Modification 5 or Modification 6 may be altered to include the health condition data described in Modification 1.

The embodiment and the modifications of the present disclosure are described above in detail. Note that the scope of the present invention is not limited to the above embodiment and modifications. In addition, the above embodiment and modifications may be subjected to various improvements or modifications without departing from the gist of the present invention. Furthermore, the above embodiment and modifications may be combined.

REFERENCE SIGNS LIST

1: information processing system
10: client device
11: storage device
12: processor
13: input-output interface
14: communication interface
15: display device
16: camera
17: depth sensor
18: microphone
19: acceleration sensor
30: server
31: storage device
32: processor
33: input-output interface
34: communication interface
50: wearable device
51: storage device
52: processor
53: input-output interface
54: communication interface
55: display device
56: heartbeat sensor
57: acceleration sensor
70: instructor's terminal

The invention claimed is:

1. An information processing apparatus comprising:
processing circuitry configured to:
obtain a user video in which a user performing exercise is seen;
obtain user data by analyzing the user video;
apply input data including the user data to an estimation model to output an index indicating an exercise load of the user based on an evaluation index of an exercise tolerance of the user as a reference, the exercise load being represented using at least one of an oxygen consumption and an energy consumption of the user during the exercise; and
present information based on the index on a client device of the user, wherein the estimation model is trained using training data including training input data based on a subject video of a subject performing exercise and labeled data corresponding to the training input data, the subject including at least one of the user and a person different from the user.

2. The information processing apparatus according to claim 1, wherein the estimation model corresponds to a trained model, a fine-tuned model of the trained model, or a distilled model of the trained model.

3. The information processing apparatus according to claim 1, wherein the user data include data on a physical condition of the user performing exercise.

4. The information processing apparatus according to claim 3, wherein the user data includes data on at least one of a skeleton, a facial expression, a skin color, respiration, and a heart rate of the user performing exercise.

5. The information processing apparatus according to claim 1, wherein the processing circuitry is further configured to:
obtain data on a cardiopulmonary condition of the user; and
analyze a relationship between the exercise load of the user and the cardiopulmonary condition of the user, wherein
the processing circuitry presents information based on a result of analyzing the relationship.

6. The information processing apparatus according to claim 1, wherein the processing circuitry is further configured to:
analyze a change over time in the exercise load of the user, wherein
the processing circuitry presents information based on a result of analyzing the change over time in the exercise load of the user.

7. The information processing apparatus according to claim 1, wherein the processing circuitry is further configured to:
make an estimation about a sign of heart failure of the user based on at least one of the user video and user voice that is obtained by recording voice of the user performing exercise; and
present information based on a result of the estimation about the sign of heart failure of the user.

8. The information processing apparatus according to claim 1, wherein the processing circuitry is further configured to:
make an estimation about a mental condition of the user based on at least one of the user video and user voice that is obtained by recording voice of the user performing exercise; and
present information based on a result of the estimation about the mental condition of the user.

9. The information processing apparatus according to claim 1, wherein
the processing circuitry outputs indices indicating exercise loads of a plurality of users performing exercise, and
presents information based on the indices indicating the exercise loads of the plurality of users to an instructor of the plurality of users.

10. The information processing apparatus according to claim 1, wherein
the processing circuitry outputs indices indicating exercise loads of a plurality of users performing exercise, and
presents information on a user whose index satisfies a predetermined condition from among the plurality of users, to an instructor of the user.

11. The information processing apparatus according to claim 1, wherein
the user video is a video in which the user playing a video game is seen, the video game being a video game of which game progress is controlled in accordance with a body movement of a player, and
the processing circuitry is further configured to determine at least one of a task relating to the video game, an incentive relating to the video game, and a game parameter about progress of the video game, at least one of the task, the incentive, and the game parameter being to be provided to the user in accordance with the index.

12. The information processing apparatus according to claim 1, wherein
the user video is a video in which the user playing a video game is seen, the video game being a video game of which game progress is controlled in accordance with a body movement of a player, and the processing circuitry is further configured to:

make an estimation about a skeleton of the user based on the user video; and determine at least one of a task relating to the video game, an incentive relating to the video game, and a game parameter about progress of the video game, at least one of the task, the incentive, and the game parameter being to be provided to the user in accordance with a result of the estimation about the skeleton of the user.

13. A non-transitory computer-readable storage medium, storing computer-readable instruction thereon, which, when executed by processing circuitry, cause the processing circuitry to execute a method comprising:

obtaining a user video in which a user performing exercise is seen;

obtaining user data by analyzing the user video;

applying input data including the user data to an estimation model to output an index indicating an exercise load of the user based on an evaluation index of an exercise tolerance of the user as a reference, the exercise load being represented using at least one of an oxygen consumption and an energy consumption of the user during the exercise; and presenting information based on the index on a client device of the user, wherein the estimation model is trained using training data including training input data based on a subject video of a subject performing exercise and labeled data corresponding to the training input data, the subject including at least one of the user and a person different from the user.

14. A method comprising:

obtaining, by a computer, a user video in which a user performing exercise is seen;

obtaining, by the computer, user data by analyzing the user video;

applying, by the computer, input data including the user data to an estimation model to output an index indicating an exercise load of the user based on an evaluation index of an exercise tolerance of the user as a reference, the exercise load being represented using at least one of an oxygen consumption and an energy consumption of the user during the exercise; and presenting, by the computer, information based on the index on a client device of the user, wherein the estimation model is trained using training data including training input data based on a subject video of a subject performing exercise and labeled data corresponding to the training input data, the subject including at least one of the user and a person different from the user.

* * * * *